(12) United States Patent
Sonar et al.

(10) Patent No.: US 11,458,067 B2
(45) Date of Patent: Oct. 4, 2022

(54) SOFT PORTABLE WEARABLE PNEUMATIC INTERACTIVE SUIT

(71) Applicant: ECOLE POLYTECHNIQUE FEDERALE DE LAUSANNE (EPFL), Lausanne (CH)

(72) Inventors: Harshal Arun Sonar, Crissier (CH); Matthew Aaron Robertson, Epesses (CH); Sagar Dattatray Joshi, Lausanne (CH); Tigmanshu Bhatnagar, Renens (CH); Jamie Paik, Lausanne (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 150 days.

(21) Appl. No.: 16/618,669

(22) PCT Filed: Jun. 1, 2018

(86) PCT No.: PCT/IB2018/053945
§ 371 (c)(1),
(2) Date: Dec. 2, 2019

(87) PCT Pub. No.: WO2018/220596
PCT Pub. Date: Dec. 6, 2018

(65) Prior Publication Data
US 2020/0093679 A1     Mar. 26, 2020

Related U.S. Application Data

(60) Provisional application No. 62/514,234, filed on Jun. 2, 2017.

(51) Int. Cl.
| | | |
|---|---|---|
| *A61H 9/00* | (2006.01) | |
| *A63B 21/00* | (2006.01) | |
| *A41D 27/00* | (2006.01) | |

(52) U.S. Cl.
CPC .......... *A61H 9/0078* (2013.01); *A41D 27/00* (2013.01); *A63B 21/4007* (2015.10);
(Continued)

(58) Field of Classification Search
CPC .... A61H 9/0078; A63B 21/4007–4009; A61F 13/013; A61F 13/586;
(Continued)

(56) References Cited

U.S. PATENT DOCUMENTS

| | | |
|---|---|---|
| 8,725,842 B1 | 5/2014 | Al-Nasser |
| D749,583 S | 2/2016 | Luckey et al. |

(Continued)

FOREIGN PATENT DOCUMENTS

| | | | |
|---|---|---|---|
| WO | 2013/033669 | 3/2013 | |
| WO | WO-2013033669 A2 * | 3/2013 | ............... A61F 5/01 |

(Continued)

OTHER PUBLICATIONS

Harshal Arun Sonar and Jamie Paik. "Soft Pneumatic Actuator Skin with Piezoelectric Sensors forVibrotactile Feedback". Frontiers in Robotics and AI. Accessed Aug. 2, 2021. (Year: 2011).*

(Continued)

*Primary Examiner* — Valerie L Woodward
*Assistant Examiner* — Paige Kathleen Bugg
(74) *Attorney, Agent, or Firm* — Nixon & Vanderhye P.C.

(57) ABSTRACT

A fully wearable system used for communication and information transfer between two users or between a user and a machine to render an effective and intuitive physical interface for combined input and output functions, the fully wearable system including a bidirectional wearable skin including distributed actuator and sensing elements, the actuator and sensing elements including a multimodal actuation layer and a sensing layer, the bidirectional wearable skin being flexible and stretchable, and a portable control device (Continued)

for controlling the distributed actuator and sensing elements, and reading signals from the sensing layer, the portable control device is configured to perform pixilated actuation for both micro- and macrostimulation of a body of a wearer by an actuation frequency and stimulation amplitude.

22 Claims, 26 Drawing Sheets

(52) U.S. Cl.
CPC ............... *A61H 2201/0103* (2013.01); *A61H 2201/0157* (2013.01); *A61H 2201/1238* (2013.01); *A61H 2201/165* (2013.01); *A61H 2201/5002* (2013.01); *A61H 2201/5007* (2013.01); *A61H 2201/5035* (2013.01); *A61H 2201/5038* (2013.01); *A61H 2201/5058* (2013.01); *A61H 2205/08* (2013.01)

(58) Field of Classification Search
CPC .. A61F 13/012; A61F 5/05816; A61B 17/135; A61B 5/4561; A61B 5/1116; B25J 9/0006; B25J 13/081; B25J 13/088; B25J 15/0023; B25J 15/12; F15B 15/10; F15B 15/103
USPC ........................................................ 601/152
See application file for complete search history.

(56) References Cited

U.S. PATENT DOCUMENTS

| | | | |
|---|---|---|---|
| 9,368,006 B1 | 6/2016 | Gorilovsky | |
| 2010/0141407 A1 | 6/2010 | Heubel et al. | |
| 2014/0224849 A1* | 8/2014 | Hiemenz | A42B 3/0473 224/271 |
| 2014/0238153 A1 | 8/2014 | Wood et al. | |
| 2016/0012689 A1 | 1/2016 | Evreinov et al. | |
| 2016/0290880 A1 | 10/2016 | Lewis et al. | |
| 2019/0374422 A1* | 12/2019 | Yeow | A61H 1/006 |

FOREIGN PATENT DOCUMENTS

| | | |
|---|---|---|
| WO | 2013/149181 | 10/2013 |
| WO | 2015/002850 A1 | 1/2015 |

OTHER PUBLICATIONS

Joon-Hyuk Park. Columbia University. "Wearable Torso Exoskeletons for Human Load Carriage and Correction of Spinal Deformities" Accessed Jul. 29, 2021. (Year: 2016).*
Xiangpan Li, Toshiro Noritsugu, Masahiro Takaiwa, and Daisuke Sasaki. "Design of Wearable Power AssistWear for Low Back Support Using Pneumatic Actuators". Accessed Jul. 29, 2021. (Year: 2013).*
Kevin C. Galloway, Panagiotis Polygerinos, Conor J. Walsh, and Robert J. Wood. "Mechanically Programmable Bend Radius for Fiber-Reinforced Soft Actuators". Accessed Jul. 29, 2021. (Year: 2013).*
Aach, M., et al., "Exoshelette in der Rehabilitation Querschnittgelähmter," Der Unfallchirurg, vol. 118, No. 2, 2015, pp. 130-137.
Alahakone, A. U., "Vibrotactile Feedback Systems: Current Trends in Rehabilitation, Sports and Information Display," IEEE/ASME International Conference on Advanced Intelligent Mechatronics, 2009, pp. 1148-1153.
Asbeck, Alan T., et al. , "Soft exosuit for hip assistance," Robotics and Autonomous Systems, vol. 73, 2015, pp. 102-110.
Benitez, Luis Manuel Vaca, et al., "Exoskeleton Technology in Rehabilitation: Towards an EMG-Based Orthosis System for Upper Limb Neuromotor Rehabilitation," Journal of Robotics, vol. 2013, Article ID 610589, 13 pages.
Bishop-Moser, Joshua, et al., "Design and Modeling of Generalized Fiber-Reinforced Pneumatic Soft Actuators," IEEE Transactions on Robotics, vol. 31, No. 3, Jun. 2015, pp. 536-545.
Del-Ama, Antonio J., et al., "Review of hybrid exoskeletons to restore gait following spinal cord injury," JRRD, vol. 49, No. 4, 2012, pp. 497-514.
Firouzeh, Amir, et al., "Soft Pneumatic Actuator with Adjustable Stiffness Layers for Multi-DoF Actuation," IEEE/RSJ International Conference on Intelligent Robots and Systems (IROS), 2015, pp. 1117-1124.
Galloway, Kevin C., et al., "Mechanically Programmable Bend Radius for Fiber-Reinforced Soft Actuators," 2013 16th International Conference on Advanced Robotics (ICAR), 2013, 6 pages.
Gerboni, Giada, et al., "Modular soft mechatronic manipulator for minimally invasive surgery (MIS): overall architecture and development of a fully integrated soft module," Meccanica, vol. 50, 2015, pp. 2865-2878.
In, Hyunki, et al., "Exo-Glove: A Wearable Robot for the Hand with a Soft Tendon Routing System," IEEE Robotics & Automation Magazine, Mar. 2015, pp. 97-105.
Kazerooni, Homayoon, "Exoskeletons for Human Performance Augmentation," Springer Handbook of Robotics, 2008, pp. 773-793.
Laschi, Cecilia, et al., "Soft robotics: Technologies and systems pushing the boundaries of robot abilities," Science Robotics Review, 2016, 11 pages.
Lee, Heedon, et al., "The Technical Trend of the Exoskeleton Robot System for Human Power Assistance," International Journal of Precision Engineering and Manufacturing, vol. 13, No. 8, Aug. 2012, pp. 1491-1497.
Maeder-York, Paxton, et al., "Biologically Inspired Soft Robot for Thumb Rehabilitation," J. Med. Devices, vol. 8, No. 2, 2014, 2 pages.
Moseley, Philip, et al., "Modeling, Design, and Development of Soft Pneumatic Actuators with Finite Element Method," Advanced Engineering Materials, vol. 18, No. 6, 2016, pp. 978-988.
Park, Yong-Lae, et al., "Design and control of a bio-inspired soft wearable robotic device for ankle-foot rehabilitation," Bioinspiration & Biomimetics, vol. 9, 2014, pp. 1-17.
Patel, Shyamal, et al., "A review of wearable sensors and systems with application in rehabilitation," Journal of Neuroengineering and Rehabilitation, vol. 9, No. 21, 2012, 17 pages.
Piwek, Lukasz, et al., "The Rise of Consumer Health Wearables: Promises and Barriers," PLOS Medicine, vol. 13, No. 2, 2016, 9 pages.
Polygerinos, Panagiotis, et al., "Towards a Soft Pneumatic Glove for Hand Rehabilitation," 2013 IEEE/RSJ International Conference on Intelligent Robots and Systems (IROS), 2013, pp. 1512-1517.
Robertson, Matthew A., et al., "Soft Pneumatic Actuator Fascicles for High Force and Reliability," Soft Robotics, vol. 4, No. 1, 2017, pp. 23-32.
Sigrist, Roland, et al., "Augmented visual, auditory, haptic, and multimodal feedback in motor learning: A reivew," Psychon Bull Rev, vol. 20, 2013, pp. 21-53.
Starner, Thad, et al., "Augmented Reality Through Wearable Computing," Presence Teleoperators Virtual Environ., vol. 6, No. 4, 1997, pp. 1-24.
Wehner, Michael, et al., "A Lightweight Soft Exosuit for Gait Assistance," 2013 IEEE International Conference on Robotics and Automation (ICRA), 2013, pp. 3362-3369.
Xiao, Robert, et al., "Expanding the Input Expressivity of Smartwatches with Mechanical Pan, Twist, Tilt and Click," Proceedings of the SIGCHI Conference on Human Factors in Computing Systems, 2014, pp. 193-196.
Yang, Dian, et al., "Buckling Pneumatic Linear Actuators Inspried by Muscle," Advanced Materials Technologies, vol. 1, 2016, 6 pages.
Yang, Dian, et al., "Negative-Pressure Soft Linear Actuator with a Mechanical Advantage," Advanced Materials Tehcnologies, vol. 2, 2017, 6 pages.
Precision Microdrives™, Product Data Sheet, Pico Vibe™, 3mm Vibration Motor—8mm Type, Model: 303-102, 2 pages.

(56) References Cited

OTHER PUBLICATIONS

Harshal Arun Sonar, et al., "Soft Pneumatic Actuator Skin with Piezoelectric Sensors for Vibrotactile Feedback", Frontiers in Robotics and AI, published Jan. 11, 2016, vol. 2, Article 38, 11 pages.
Chansu Suh, et al., "Soft Pneumatic Actuator Skin with Embedded Sensors", 2014 IEEE/RSJ International Conference on Intelligent Robots and Systems, IEEE, Sep. 14-18, 2014, pp. 2783-2788.
International Search Report for PCT/IB2018/053945 dated Nov. 16, 2018, 6 pages.
Written Opinion of the ISA for PCT/IB2018/053945 dated Nov. 16, 2018, 9 pages.

\* cited by examiner

Skiing

Golf

Balance

SOFT PORTABLE WEARABLE PNEUMATIC INTERACTIVE SUIT

CROSS REFERENCE TO RELATED APPLICATIONS

This application is the U.S. national phase of International Application No. PCT/IB2018/053945 filed Jun. 1, 2018 which designated the U.S. and claims priority to U.S. Provisional Patent Application No. 62/514,234 filed Jun. 2, 2017, the entire contents of each of which are hereby incorporated by reference.

FIELD OF THE INVENTION

The present relates to wearable devices, soft robotics, human-machine interaction, haptic communications, and virtual or augmented environments, and methods of operating the same.

BACKGROUND

Overview of Wearable Robotic Technology

Wearable exoskeletons and robotic suits have been the focal point of a large extent of current and past research [1]-[5], primarily aimed at augmenting the capabilities of a human user either for therapeutic, restorative, or enhancing benefits. Alternatively, wearable robotic suits have been proposed for scenarios of immersive technology, to provide virtual sensation and simulated physical interactions [6]. These devices have been shown in limited capacity to deliver particular benefits as designed (such as heavy weight lifting), although none have been shown without an associated drawback, such as fatigue, or simultaneous decrease in another capability. Without normalizing for the added cost of existing wearable systems, it has been difficult to show their overall usefulness. Coupled to this minimal return, is the intrinsic risk involved in adopting what is essentially industrial style technology (rigid, bulky, metallic components) and control methods for use in close proximity to the human body which is soft and sensitive to non-normative kinematics, dynamics, and other outside physical constraints. Given the difficulty of designing these robotic suit devices, the current prospective for their application is still generally impractical. Nevertheless, new approaches to design hold promise for applying the concept of a wearable robotic suit to less demanding applications, namely as an experientially rich computer and portable electronics interface mechanism for intuitive and enhanced, digital and physical communication.

The challenges in these types of mechanically active, wearable applications have driven interest in and evolution of new technology more appropriate for direct interaction with the human body. In particular, soft technology has emerged to address challenges in the mechanical interface and compatibility of actuators, structures, and sensors with biomechanical forms and functions. This approach involves the use of materials for construction of mechanisms and components which offer passive function, including natural compliance, flexibility, robustness, adaptability, and even a simpler path to customizability before a complete system is even fully assembled [32]. Using these types of components as a starting point for a wearable system greatly improves the potential for comfort, safety, and reliability of wearable systems which physically engage the human body in any form.

A direct physical interaction with human body enables novel ways of information transfer between a robotic system and a user through tactile stimulation. Such a tactile feedback coupled with more traditional audio and visual modes of interaction results in a sensory rich interaction that can provide a wholesome user experience in many applications [34]. Haptic feedback is the only sensory modality that allows humans to interact bi-directionally to sense the environment as well as provide an action; making it crucial to have the haptic devices with integrated sensing that has knowledge about the wearable environment for an intuitive communication. The aspects of wearable communication, sensing and actuations have been investigated primarily as independent components until now. However to provide the most meaningful, intuitive interaction experience a need remains for a complete system combining these functions.

Overview of Wearable Input Sensing and Communication

One of the key role for wearable devices is to acquire information about the environment through sensing the physical and biomechanical parameters. The available wearable devices mainly fall in the category where they have elements such as accelerometers, gyroscopes, heart-rate sensors, glucose level sensors, touch panels, embedded inside a rigid form factor to acquire vital physiological parameters [28]. These traditional sensing and input devices have rigid, non-stretchable or non-flexible form factor and thus cannot be directly integrated into soft conformant platform limiting their ease of use. There have been recent developments in making soft wearable sensors to measure physical parameters like strain or pressure which can be adapted to measure external environment interaction [29], [30].

While comparable effort has been spent on the development of wearable soft mechanical systems and wearable electronics independently, less work has achieved efficient integration of the two. Some initial progress has been made in this area in making wearable soft tactile displays using dielectric elastomeric actuators which can have integrated sensing but they need to have high voltage input for actuation [31].

The lack of integrated sensing is mainly due to lack of compatible materials that are soft, and can withstand high strains (>50%) similar to what human skin undergoes. In many applications, wearable devices are required to provide tactile feedback to augment extra sensory information [28]. The devices designed to provide tactile feedback operated in open-loop meaning the actuation has limited or no information about the external environment around them which affects the system performance.

Output: Active Soft Pneumatic Devices

With respect to meso scale actuation, ractile stimulation is a critical part of physical interactivity, involving the external mechanical perturbation of body skin to convey a variety of different types of environmental information. This is typically used to distinguish patterns, shapes, and physical qualities like roughness or pressure. Artificially, similar information can be conveyed through a variety of methods of meso actuation, which produce small scale forces at specific locations on the body. Wearable devices have been developed for many applications which required this type of tactile feedback for augmented information [28]. Most of the wearable tactile devices rely on electromechanical components which are bulky, rigid and complex in design limiting the ultimate comfort and utility due to the lack of compliance and compactness [33]. At the same time these devices are mainly open-loop, meaning the actuation has limited information about the external loading that may affect the system performance.

With respect to macro scale actuation, wearable physical feedback devices at the macro level can be described by those which directly interact with the body segments or engage in whole body manipulation. In previous work the use of soft technology in wearable forms for direct application of forces to the body has been generally limited to specific, localized assistive devices [7]-[10]. The exception to this has been the development of a few soft robotic exo-suits [11], [12], which differ from the more commonly researched robotic "exoskeleton" type suit which provides mechanical support through ground contact of fixed anchors. The soft exo-suit in contrast utilizes primarily flexible components to generate or transmit forces and attach to the body. These components can include fabrics, flexible tendons, or Soft Pneumatic Actuators (SPAs). The latter of these is the most active area of soft robotics research and development, where actuation has been demonstrated by use of both positive and negative pressure air supplies and forces in both the meso-scale [13]-[16] and human-scale [17]-[20] to achieve a highly versatile range of functions.

While Soft Pneumatic Actuators (SPAs) alone are advantageous for direct human interaction and wearable robot actuation, pneumatic systems are commonly, inappropriately bulky for this application. These devices require a dedicated subsystem for pressure generation, storage, and control, include pumps, pressure tanks, and valves in addition to further hardware to support their function and integration. However, as soft technology is actively being pursued in research to exploit its various benefits [21], a real need exists for developing a supporting pneumatic subsystem where weight, size, and efficiency, which did not matter for systems in the industrial domain, are the new priority for wearable soft pneumatic devices.

Overview on Portability of Wearable Soft Systems

The use of soft actuators powered by pneumatic power is gaining momentum in the realm of robotics. Numerous projects are being developed that use silicone rubber based actuators for end effectors, rehabilitation, exploration robots, locomotory robots etc. These systems have either a completely soft body, or a combination of hard components and soft actuators, which are powered by a pressurized air. However, most of the times, the system is tethered to an external pneumatic power supply, in the form of a compressor or stored high pressure air tanks. This limits the usage of these systems to research laboratories or few specific industrial applications. But for many other applications, especially like a wearable robotic system or for exploratory robots, a tethered power supply is highly undesirable. To tackle this issue, some researchers have incorporated a portable pneumatic supply in form of a mini compressor, liquid $CO_2$, and hydrogen peroxide decomposition to provide pneumatic power. Although these systems do have a portable supply, the focus of their work is on the design of the soft robotic system rather than the power supply. As a result, most of these are quite simple, with less control on the flow, pressures and power outputs of the pressure source. Thus, there is a need for a pneumatic equivalent of a battery.

While having a portable pneumatic supply in itself is a difficulty, there is no proper control of pressure or flow rates to the different actuators in the existing portable systems. Most systems need more than one output channel for pneumatic supply and each channel may require different flow rates and/or pressures. For good control of actuators, the system should be able to modulate at least one of the parameters among pressure, output load and output displacement. Furthermore, there can be constraints on the maximum pressure, output force or displacement of each actuator. Hence there is a need for a device that can facilitate independent control of its output channels, while also being portable.

SUMMARY

According to one aspect of the present invention, a soft, wearable, pneumatically actuated device is provided for interface applications between human-machine, or tele-present human-human interactions with a pneumatic power supply, and on-board electronics processing and control devices in an untethered, portable soft robotic suit. The integrated pneumatic supply allows actuation of force, pressure, and vibrotactile feedback mechanisms applied to body surface areas of the wearer as well as the actuation of whole body segments, including joints. Additionally, embedded "smart" materials may be integrated in the suit allow mechanical properties, such as stiffness, of specific components to be actively modified and tuned, to convey passive physical signals. This feedback can define the first direction of information exchange available through the soft interactive suit, to the wearer. The second direction of information exchange is made possible through soft flexible or stretchable sensors embedded in the various subsystems to provide input back to the robotic system, from the human user or the suit motions itself. This can then be used to implement closed loop control of the active mechanisms by embedded controllers, to directly modify or control suit functions, or to communicate through network connections to off-board systems including remote users for fully bi-directional interactions. These functional capabilities allow intuitive interaction with technology not bounded by distance or location to enhance experiences of communication, control, or entertainment.

According to another aspect of the present invention, a soft pneumatic actuator wearable device is provided. Preferably, the soft pneumatic actuator includes a bidirectional wearable skin including distributed actuator and sensing elements, the actuator and sensing elements including a multimodal actuation layer and a sensing layer, the bidirectional wearable skin being flexible and stretchable, and a portable control device for controlling the distributed actuator and sensing elements, and reading signals from the sensing layer, the portable control device is configured to perform pixilated actuation for both micro- and macrostimulation of a body of a wearer by an actuation frequency and stimulation amplitude.

According to still another aspect of the present invention, a portable power and control device for a wearable interaction device is provided. Preferably, the portable power and control device includes a power generation system for producing a positive pressure and a vacuum to a fluid, a device for delivering electric power for powering the power generation system, and a pneumatic reservoir for storing the fluid and the positive pressure and the vacuum generated by the power generating system. Moreover, the device further preferably includes output channels operatively attached of the pneumatic reservoir for providing at least one of the positive pressure and the vacuum to the wearable interaction device, an electro-pneumatic system in operative connection with the output channels, including a valve and a pressure sensor for each output channel, the electro-pneumatic system configured to measure, monitor and control the fluid through the output channels, and a microcontroller for controlling the power generation system and the electropneumatic system.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

Herein, identical reference numerals are used, where possible, to designate identical elements that are common to the figures. Also, the images are simplified for illustration purposes and may not be depicted to scale.

DETAILED DESCRIPTION OF THE PREFERRED EMBODIMENTS

Figure 1B:
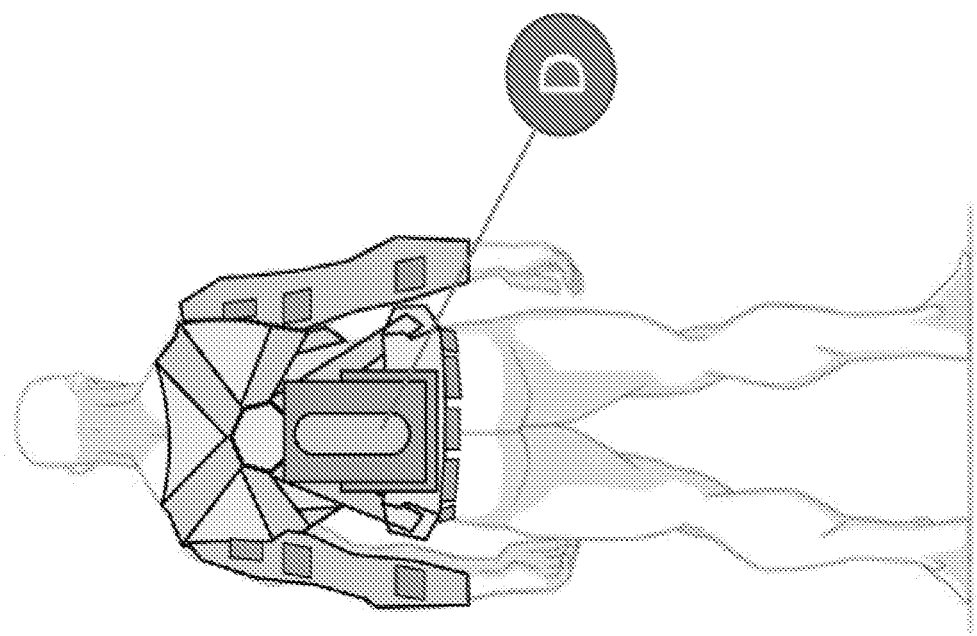
FIGS. 1A to 1E schematically show the primary components of a fully wearable soft interactive suit, with FIG. 1A showing with a front side of the suit with an exemplary input and tactile output actuation device A, showing a an exemplary whole body postural actuation B, with C indicating an exemplary location for targeted body actuation, and in FIG. 1B depicting a rear side or view of the suit and showing a location of an exemplary portable pneumatic power supply D, FIG. 1C schematically showing the device for a whole body postural actuation B in the form of a belt, FIG. 1D schematically showing a device for targeted body actuation C, and FIG. 1E schematically showing a device for portable pneumatic power supply D that can be worn like a back pack.
Figure 1A:
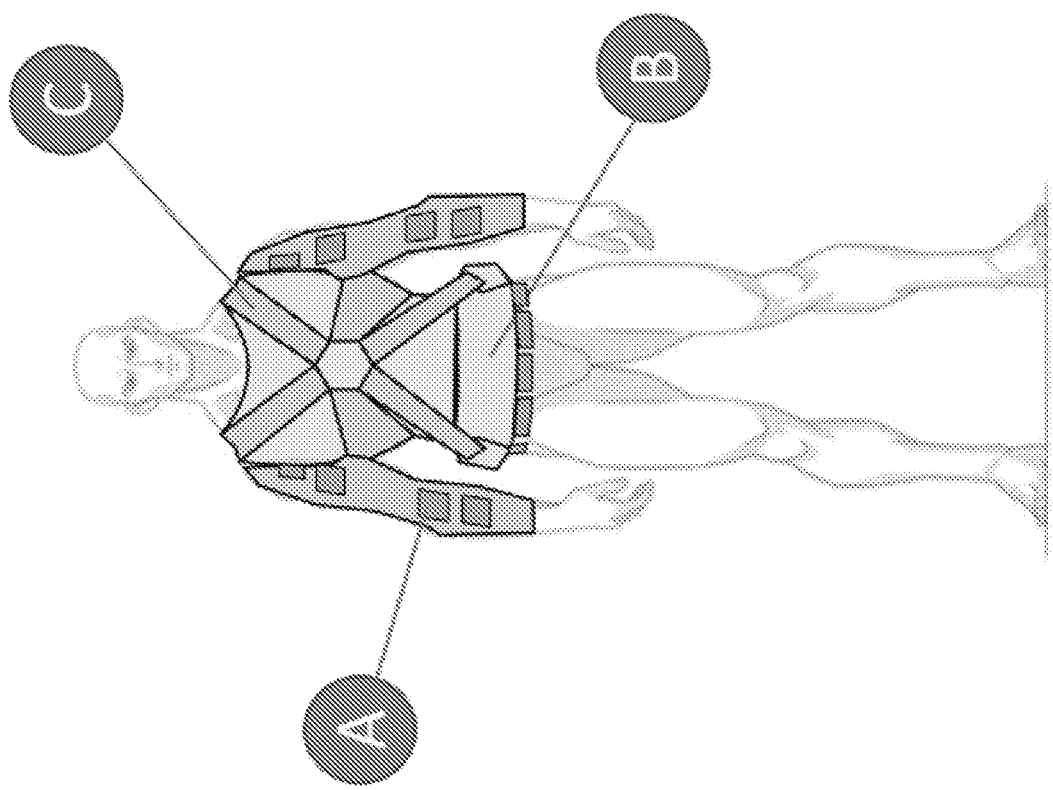
Figure 1C:
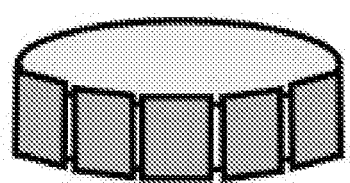
Figure 1D:
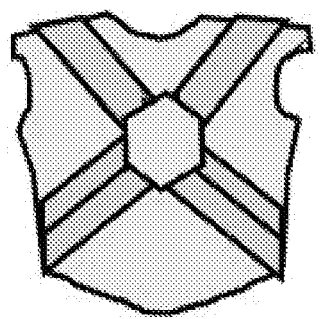
Figure 1E:
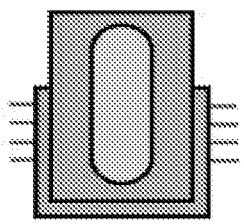

According to one aspect of the present invention, a system is provided for including a fully wearable soft interactive suit, with FIG. 1A showing with a front side of the suit with an exemplary input and tactile output actuation device A, showing a an exemplary whole body postural actuation B, with C indicating an exemplary location for targeted body actuation, and in FIG. 1B depicting a rear side or view of the suit and showing a location of an exemplary portable pneumatic power supply D, FIG. 1C schematically showing the device for a whole body postural actuation B in the form of a belt, FIG. 1D schematically showing a device for targeted body actuation C, and FIG. 1E schematically showing a device for portable pneumatic power supply D that can be worn like a back pack. The input and tactile output actuation device A can include one ore more soft pneumatic actuators (SPA), in FIG. 1A indicated as square patches, the SPA having a layered structure as further discussed below with respect to FIGS. 3, 4, 5A to 5C, and 6.

A. Bidirectional SPA Skin

Input Output Bidirectional SPA Skin with Integrated Sensor

Figure 2:
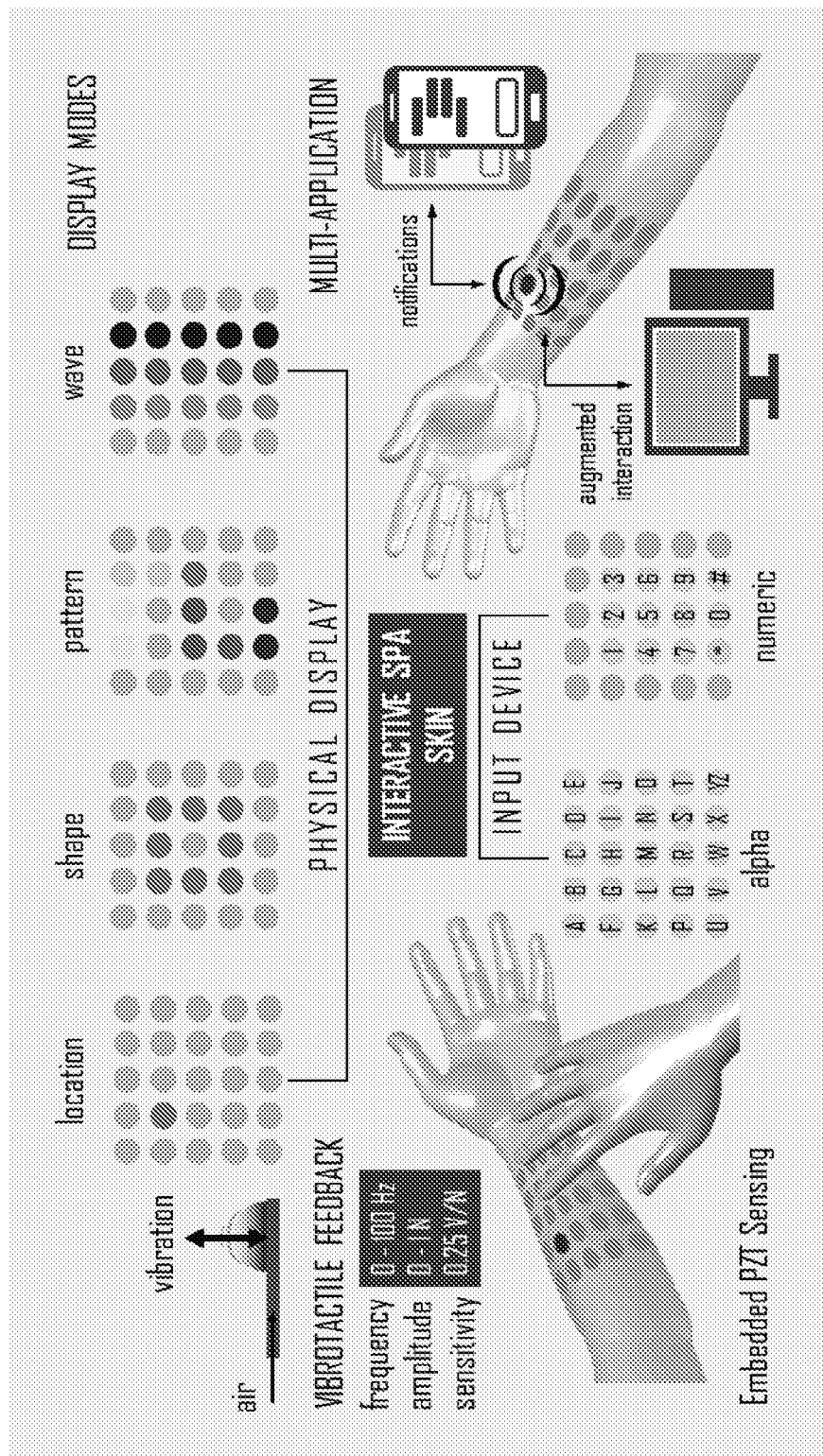
FIG. 2 shows a schematic overview of interaction capabilities with the interactive SPA-skin. Pressurized air is supplied to a matrix of small inflatable tactile pixels, or taxels, embedded in a thin silicone rubber sheet, worn as a flexible, stretchable patch directly on the skin. Each taxel can be independently controlled by changing both the amplitude and frequency of the supply pressure to convey information via various modes through vibratory stimulation. Additionally, the taxels can be operated in sequence or combination to convey patterns or shapes. Concurrently sensors are embedded in each taxel to allow either closed loop control of taxel actuation in output mode, or serve as an input device for the user to control the soft suit, or communicate with other machines networked to it.

According to one aspect of the present invention, a system where multiple modes of information transfer can be used for communication between two or more individuals, which will utilize not only the existing audio visual modes but would extend it to the proprioceptive senses as depicted in FIG. 2. The input output device is pneumatically actuated to produce vibratory output and have an integrated sensor layer to acquire the external stimulations. The device has each tactile pixel (taxel) actuated and controlled independently to produce various sequences, different tactile modes such as the location, shape, pattern, vibration, etc. can be conveyed to wearer. At the same time, by virtue of its sensory layer, each taxel can also be used to read an input from the user. Such an acquisition of input for external perturbations along with complex tactile pattern generation and efficient communication between the two devices create new avenues for notification and information transfer between two humans, or between a human and a computer.

Figure 3:
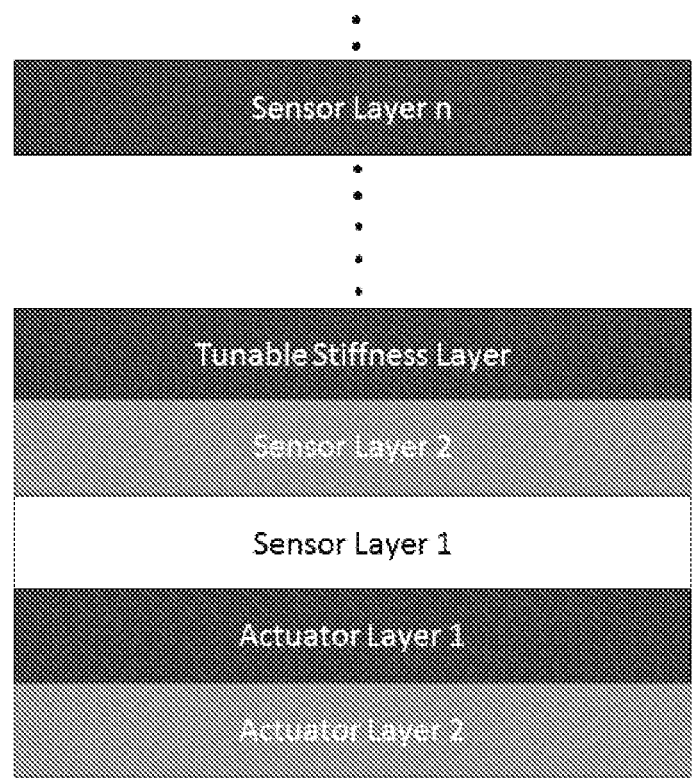
FIG. 3 schematically shows a cross-sectional view of the layer structure of SPA skin.
Figure 4:
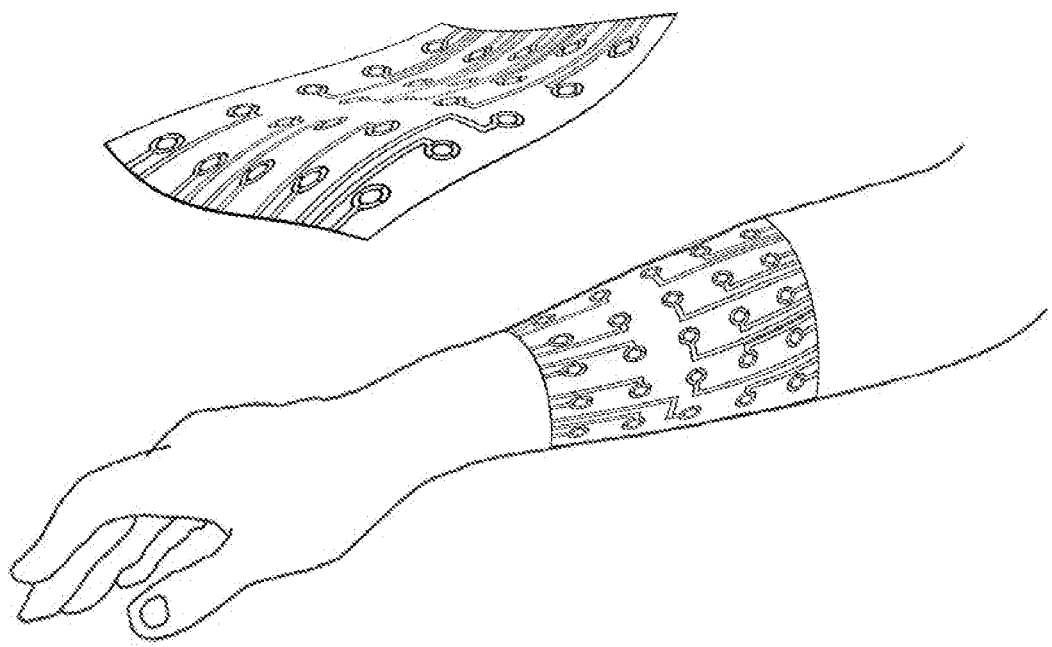
FIG. 4 schematically shows soft, flexible, stretchable SPA skin conformant to body interface.
Figure 5A:
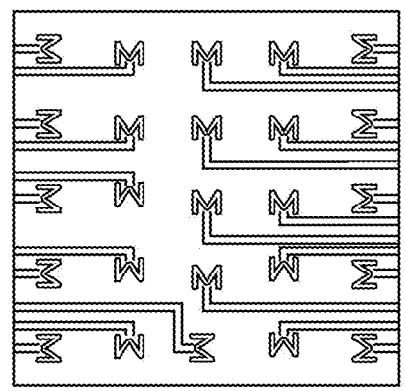
FIGS. 5A to 5C schematically shows a top view of customizable inflation geometry for different feedback patterns.
Figure 5B:
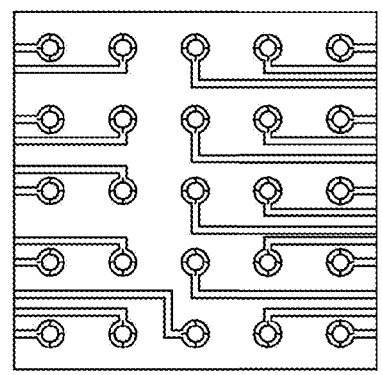
Figure 5C:
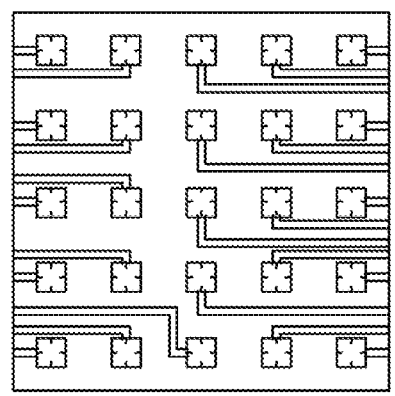
Figure 6:
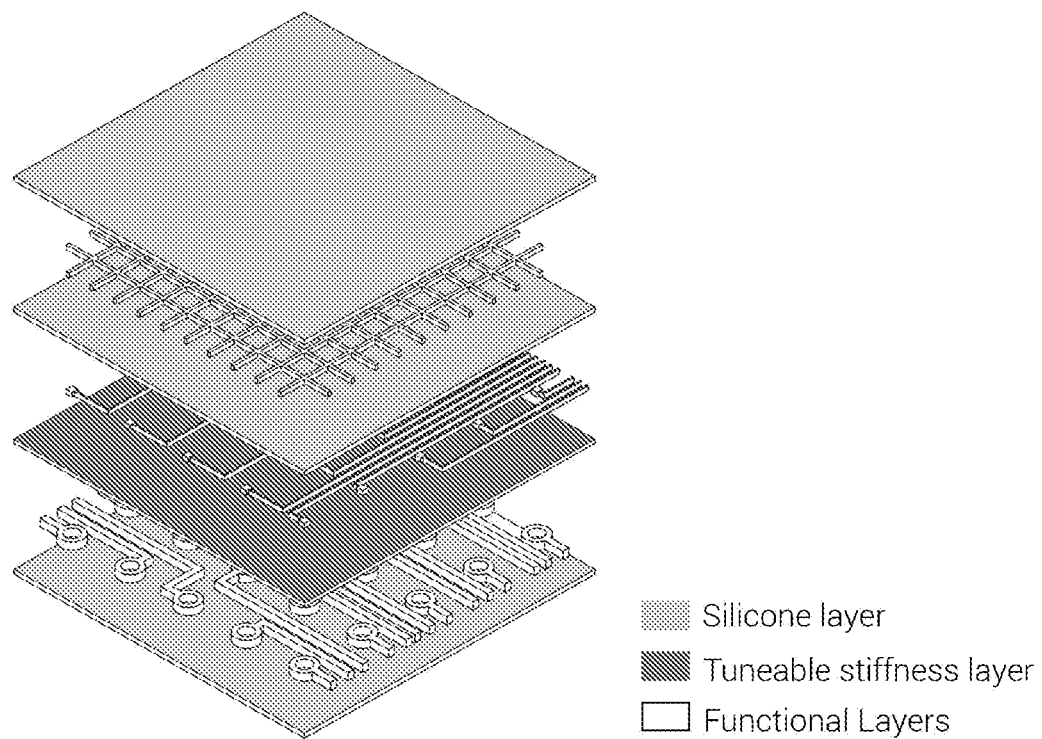
FIG. 6 schematically shows an exploded view of a multilayer construction of the SPA skin that can be used for as input and tactile output actuation device A.
Figure 7A:
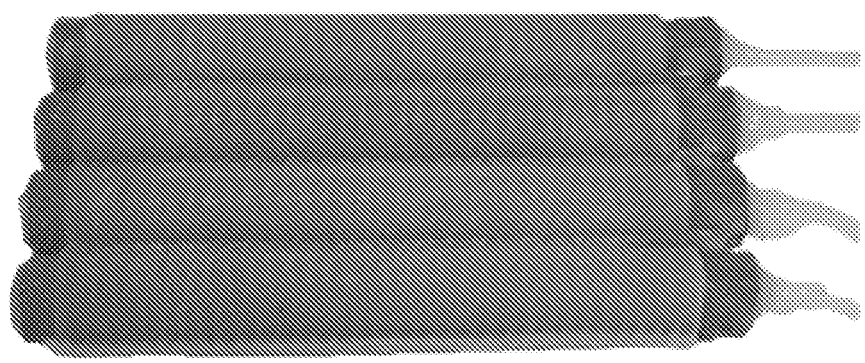
FIGS. 7A to 7D schematically shows different aspects of an exemplary the wearable belt device was produced using SPA packs as shown in FIG. 7A arranged on a reconfigurable belt, as shown in FIG. 7B to enable whole upper body manipulation. To demonstrate the effectiveness of the device in a closed loop wearable form, an IMU was used to record the angle of trunk motion of test subjects while a sinusoidal signal was used to drive them to alternating postural positions FIG. 7C. The position of the belt on a subject is shown in FIG. 7D, while this location and configuration serves only as an example for other soft wearable applications which could provide more targeted body segment manipulation for informative feedback.
Figure 7B:
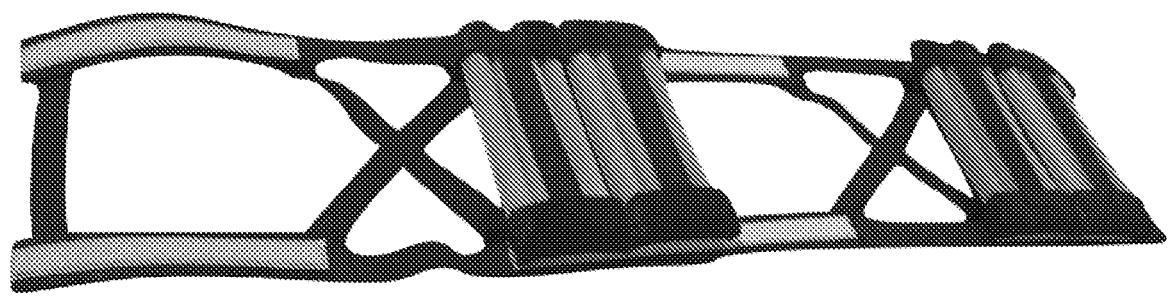
Figure 7D:
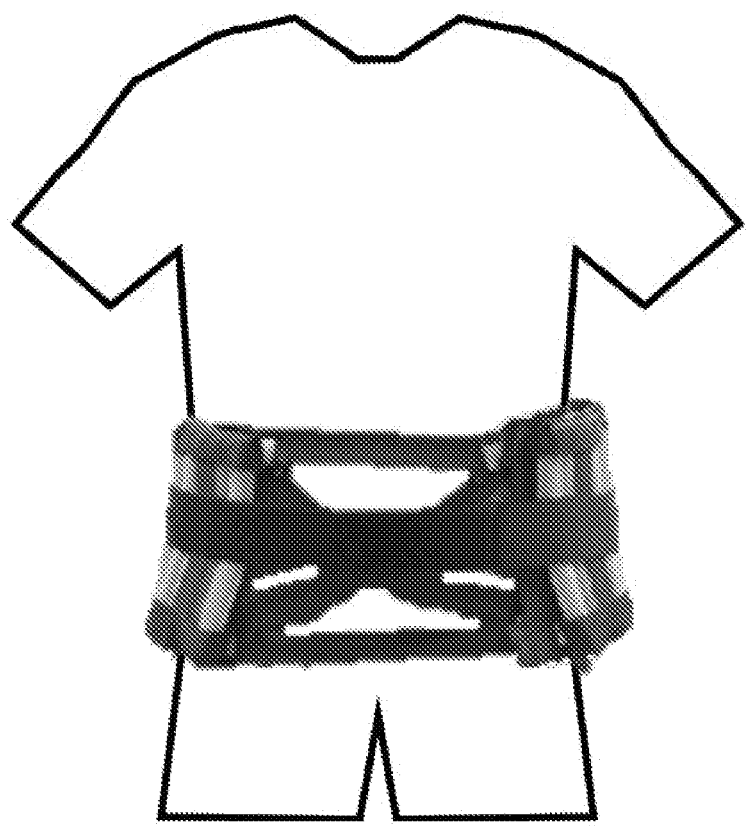
Figure 7C:
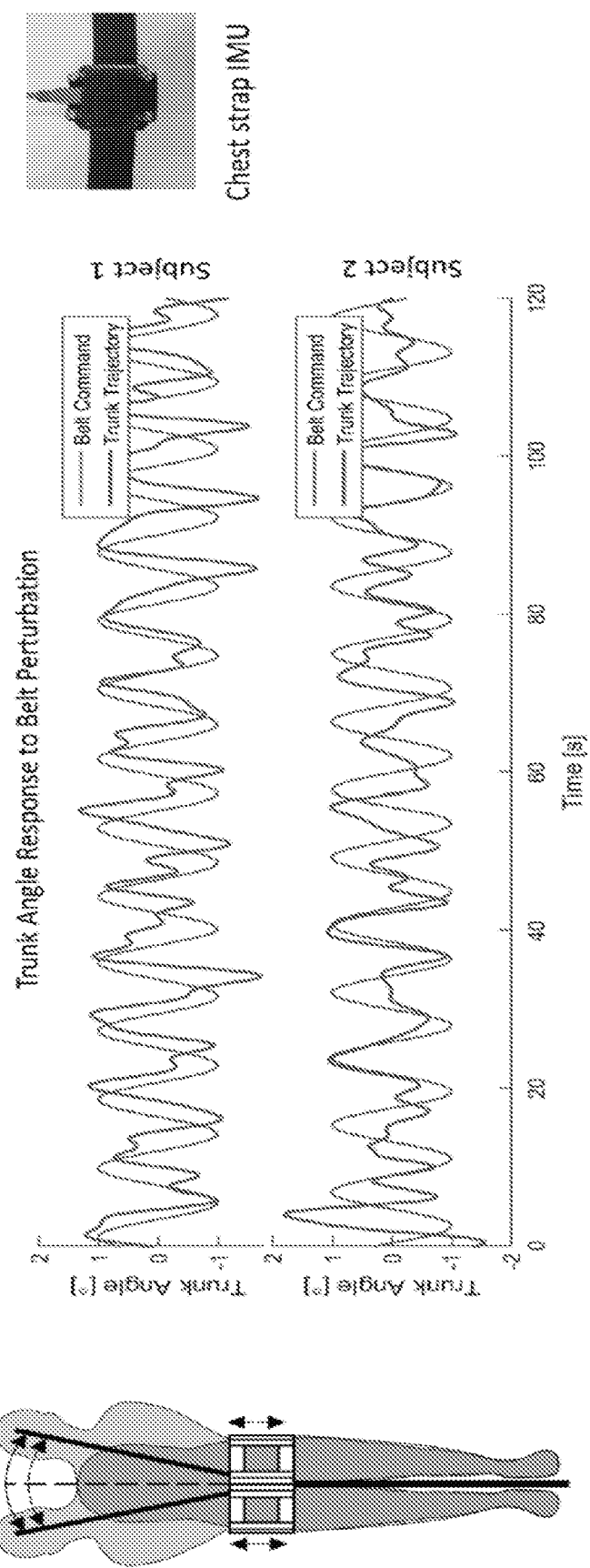
Figure 8A:
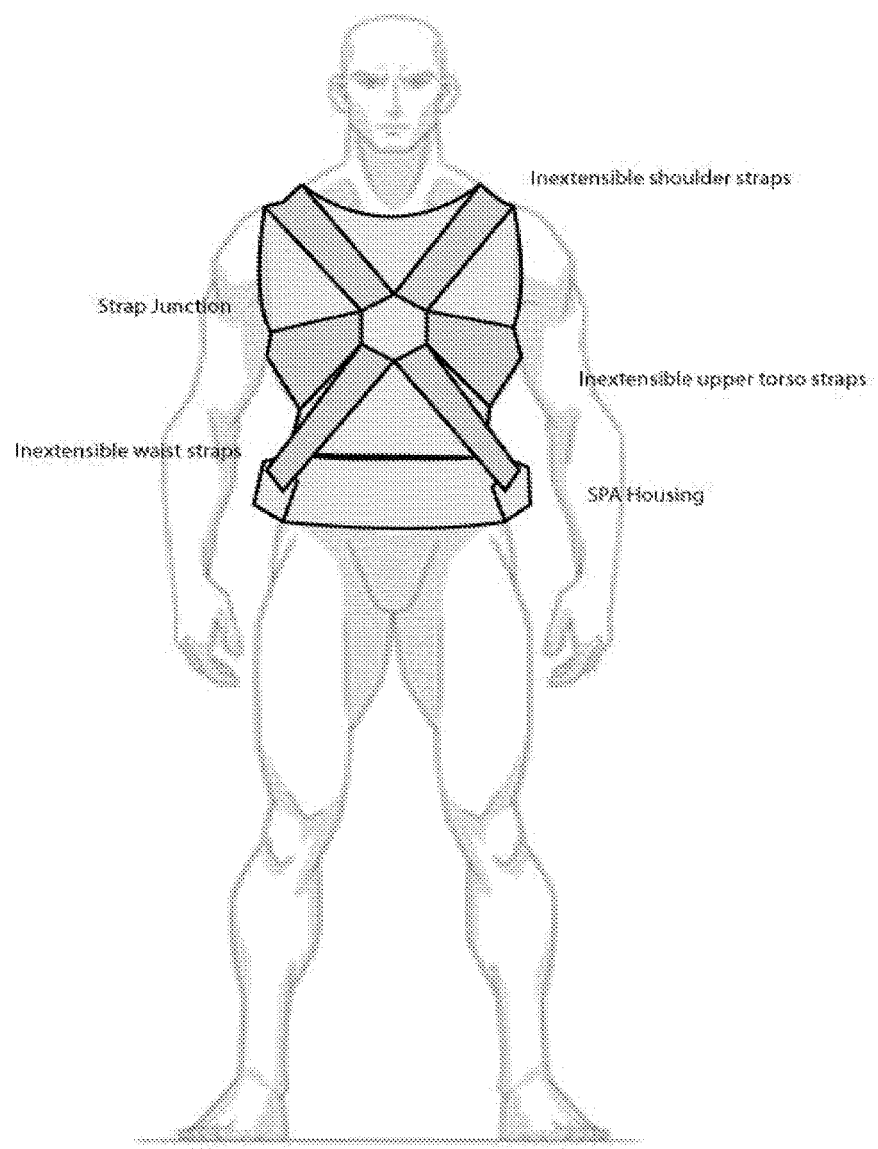
FIGS. 8A to 8E schematically show the soft Torso exosuit for human-machine interaction worn by a human, with FIG. 8A showing the front side of the soft vest, FIG. 8B showing the back side of the soft vest, FIG. 8C schematically showing a motion of providing extension and flexion, FIG. 8D showing lateral bending, and FIG. 8E showing torsional bending with the soft torso exosuit.
Figure 8B:
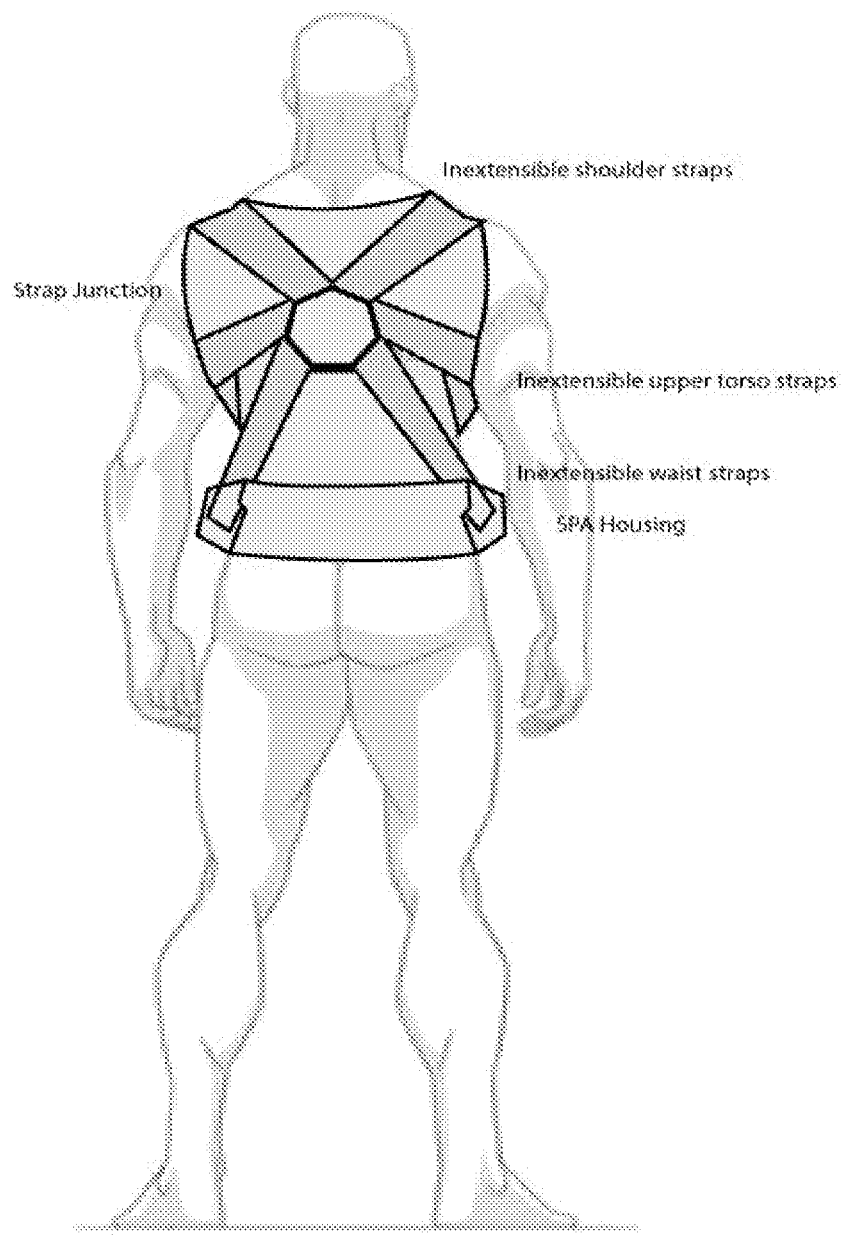
Figure 8C:
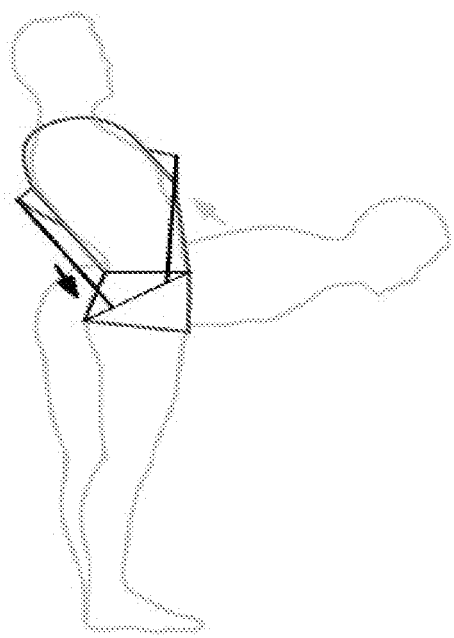
Figure 8D:
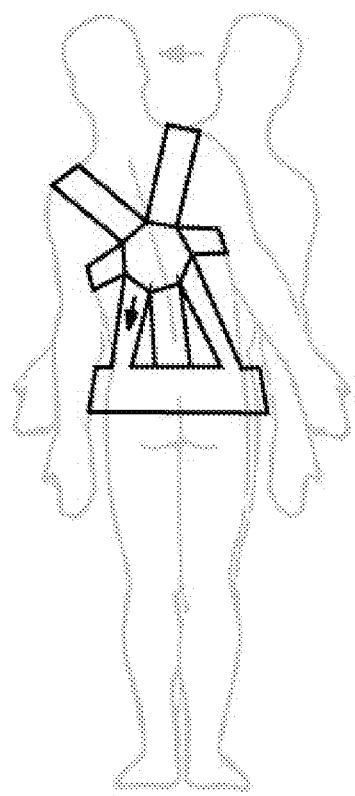
Figure 8E:
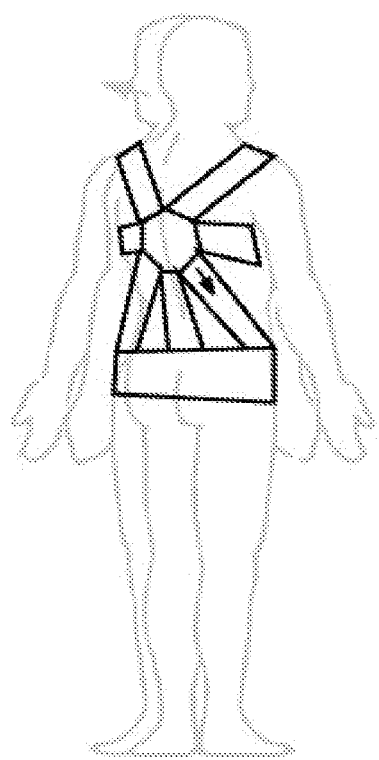

Towards achieving this vision without compromising on the "true wearability", a soft wearable device has been developed that can be placed directly on the skin to provide a modulable and high fidelity haptic feedback: a SPA based device with integrated tactile sensors. The SPA-skin design is based on integration of multiple functional layers into one low profile device capable of achieving targeted sensing and actuation capabilities over curved surfaces. FIG. 3 shows an example of multiple functional layers including sensing, actuation, display and tunable stiffness layer embedded into a single silicone form factor which is conformant to be worn over human body curvature, shown in FIG. 4, a three-dimensional exploded view of the physical layers is shown in FIG. 6.

This multi-layered compliant SPA-skin is capable of producing high frequency vibrations with modulable amplitude. An exemplary embodiment that has been developed, the SPA is of a square shape, measures 70 mm×70 mm×1.5 mm, includes sixteen (16) independently actuated and controlled elements arranged in an exemplary 4×4 matrix. Each element—"taxel"—includes an actuation layer and a sensing layer. The actuation layer is constructed by creating a pneumatic channel between two adjacent silicone layers. The sensing layer includes a piezoceramic (PZT) element that produces electrical charges proportional to the contact force. Since the layers are fabricated separately and later integrated together, they form a modular, highly customizable and failsafe design, as shown in FIG. 5. The embedded piezo-ceramic sensors, the quasi-2D form and low-profile, the soft SPA-skin provides an ideal "hardware" interface for high fidelity haptic feedback backed with sensing and actuator closed-loop control.

B. Whole Body Manipulation

Whole body manipulation is achieved by distributing modular soft actuators around large body joints, such as the hip and lower segment of the torso. An exemplary embodiment in the form of a simple belt to exert a moment between the upper and lower body in order to induce large changes in body posture. In the implemented design, SPAs grouped in parallel packs can be arranged around the perimeter of the belt to apply forces in any desired direction, comprised of two principle modes of Anterior-Posterior (AP) and Medial-Lateral (ML) deflection. Each SPA pack as produced for the prototype, is capable of producing greater than 100 N force to be transmitted as moment by appropriate constraints. The configuration of the SPA packs in location around the belt depends on the type of mechanical feedback or simulated output that is desired. The configuration of the SPAs themselves can also be changed to suit desired dynamic performance. Greater forces and moments can be achieved with this type of soft actuator by increasing the number of constituent SPA "fibers", or by utilizing additional packs in parallel. In general, the application of such SPAs in modular form allows customizable mechanical feedback for macro level body positioning. The ability to affect body posture for feedback enables a useful form of information transfer unavailable by any other automated, wearable means. Such ability can be used in training exercises for sports technique or physical therapy, virtual interactions with machine environments, or telepresent communication. The viability of this concept is demonstrated with an initial prototype capable of manipulating body trunk angle in multiple directions (FIGS. 7A-7D).

While whole body manipulation through a modular actuated belt enables large scale feedback motions, this simple configuration does not allow higher resolution, detailed modes of mechanical feedback to limited body segments. To achieve this, a second level of precision actuation can be employed to complement bulk motion feedback. The versatility of the modular, wearable soft actuator system can be further improved by distributing actuators across different body joints and implementing more specific constraints and transmission mechanisms in parallel to the wearable belt to achieve precise and targeted motions.

C. Powered Torso Suit for Targeted Haptic Feedback

While the section above describes the actuators used for whole body motion, this section deals with the design and implementation of a flexible harness-type system that can impart specific motions to the wearer. Locations on the torso have been identified such as the iliac crest, the lateral side of the hip, the shoulders, etc. where force can be applied safely. Applying haptic forces at these areas is more effective over other areas, as they allow higher forces without providing discomfort, and do not deform much. The designed harness-suit does not generate additional constraints, but when actuated applies forces and moments to specific portions of the body. Based on the design of the harness, different types of specific motions can be given such as lateral bending, torsion, flexion and extension. These are provided by careful control of the soft pneumatic actuators. It also includes passive components made of nylon straps, and foam elements. These passive components transmit the forces from the actuators to the body at specific points to give fine control of the motion.

Another exemplary embodiment of the suit utilizes strap based configuration, like a harness to wear on the body. However, a product archetype of the suit would be like a jacket, with the mechanism inside layers of fabric. FIG. 8 shows a view of the exemplary embodiment of the suit. It can be seen that by actuating different actuators, different types of motion can be imparted. Such a device can be used in sync with Virtual spaces to give a more realistic experience to the user. Similarly, it can also be used in sports training to improve techniques, balance, etc.

D. On Board Control System and Pneumatic Power Supply: PneuPower

In order to be able to use all of the technologies mentioned above, it is preferable to have a system that can provide the necessary power and control for the different actuators. Like most other systems, the soft wearable interactive suit has a number of actuators, which may require one or more of, pressurized air, vacuum and electric power. For good performance, it is needed to have independent control of all actuators. A system is proposed that can control multiple degrees of freedom independently at the same time. Furthermore, since the focus is primarily developing a wearable device, it was decided to create an on-board power supply that could make the whole suit and its control system portable. In order to facilitate that, the design incorporates additional components that can provide pressurized air, vacuum and electrical power for (but not limiting to) soft robotics in a wearable system.

Figure 9:
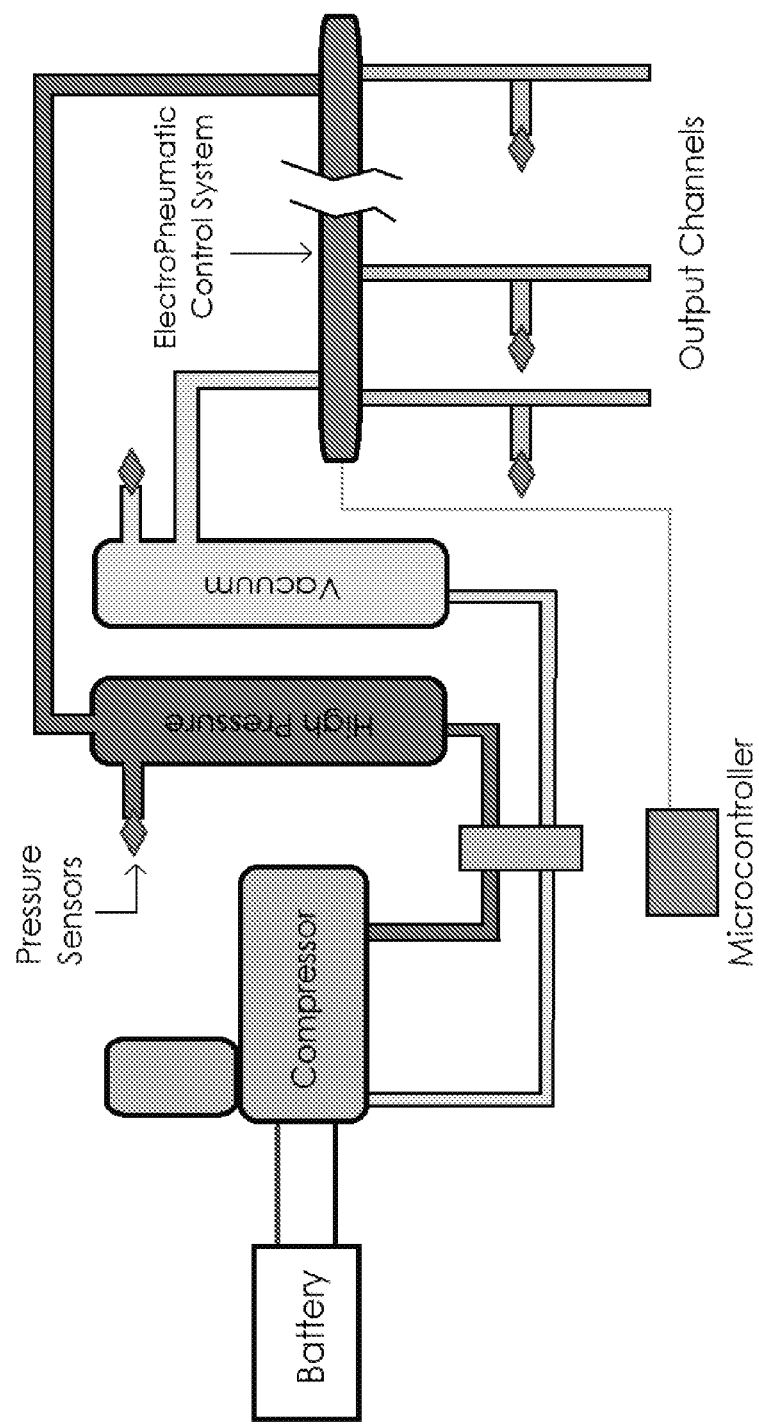
FIG. 9 shows an exemplary embodiment of the schematic of electromechanical elements of the portable pneumatic supply device.
Figure 10:
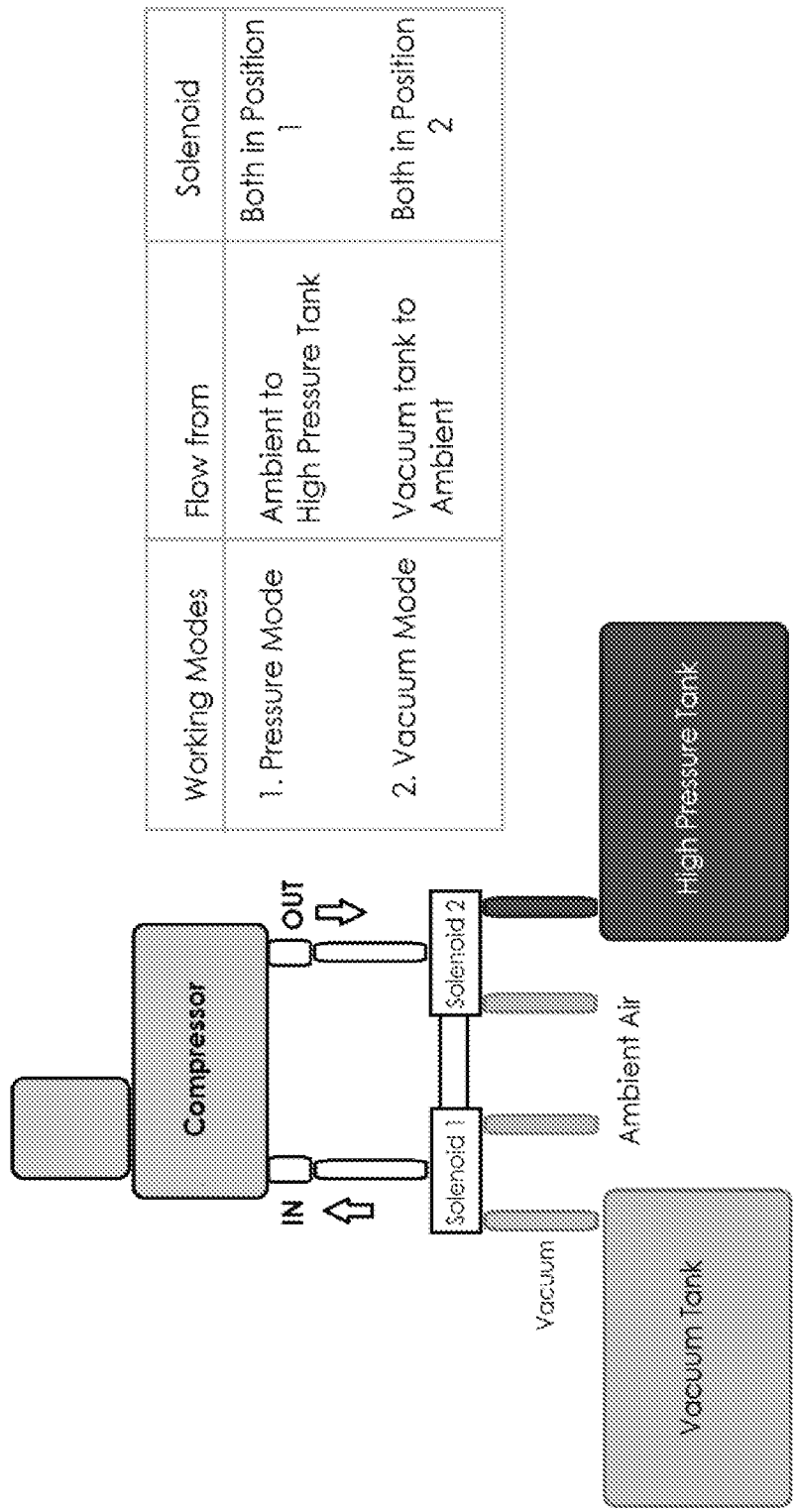
FIG. 10 shows an exemplary embodiment of the power system.

The portable power and control system includes at least one compressor, a battery pack to provide for electrical energy, two storage tanks for pressurized fluid such as air and vacuum, an electro-pneumatic system and a microcontroller. It is completely free of external tethers for power, air supply or control signals. FIG. 9 shows an exemplary view of an overall schematic of the portable pneumatic supply. It includes a compressor, two (2) storage tanks (one each for pressurized fluid and vacuum), a battery, an electro-pneumatic control system, pressure sensors and a microcontroller. The compressor can be configured to generate and provide vacuum and pressurized air into the respective storage tanks. The microcontroller can be configured to control the electro-pneumatic control system to modulate the flow rates and pressure outputs of each output channels. Various types of actuators can be connected to the output channels by using simple pneumatic connections. Below is the detailed description of the same:

The power system comprises the compressor and the two storage tanks. As seen in FIG. 10, the compressor can operate in two (2) modes: Pressure mode for providing a fluid with a pressure and a vacuum mode. When in pressure mode, it sucks air from the atmosphere and stores the pressurized to a high-pressure storage tank. In the vacuum mode, it sucks air from a vacuum tank and exhausts it to the atmosphere. Even though the compressor can work in only one mode at a time, using the storage tanks, it is possible to have high pressure as well as vacuum at all times. The tanks act similar to flywheels, which can store energy, and allow a sudden high power output, substantially higher flow rates than maximum possible by the compressor itself.

The outputs from the power system are fed to the electro-pneumatic control system which modulates the output flow rates and pressures of each channel independently. These pneumatic channels can work in either pressure mode or vacuum mode. These output channels are made using a combination of flow valves between the storage tanks, ambient air and the output channels. Each output channel can be connected to an actuator easily by simple pneumatic attachments. Opening and closing of the different valves of a channel controls the direction of flow to and from the connected actuators. Use of proportional flow valves allow a more finer control, but standard ON-OFF solenoids can also be used.

The sensory system is a collection of sensors that measure the pressure of the output channels, and each one of the storage tanks, operatively connected to the microcontroller. Each output channel is connected to a pressure sensor to facilitate feedback control. Other than pressure sensors, additional sensors can be provided, such as temperature sensors for temperature sensing to monitor compressor temperature, or voltage or current sensor to monitor the battery power, the IMUs to the wearer, etc. can be easily integrated to the whole system.

Figure 11:
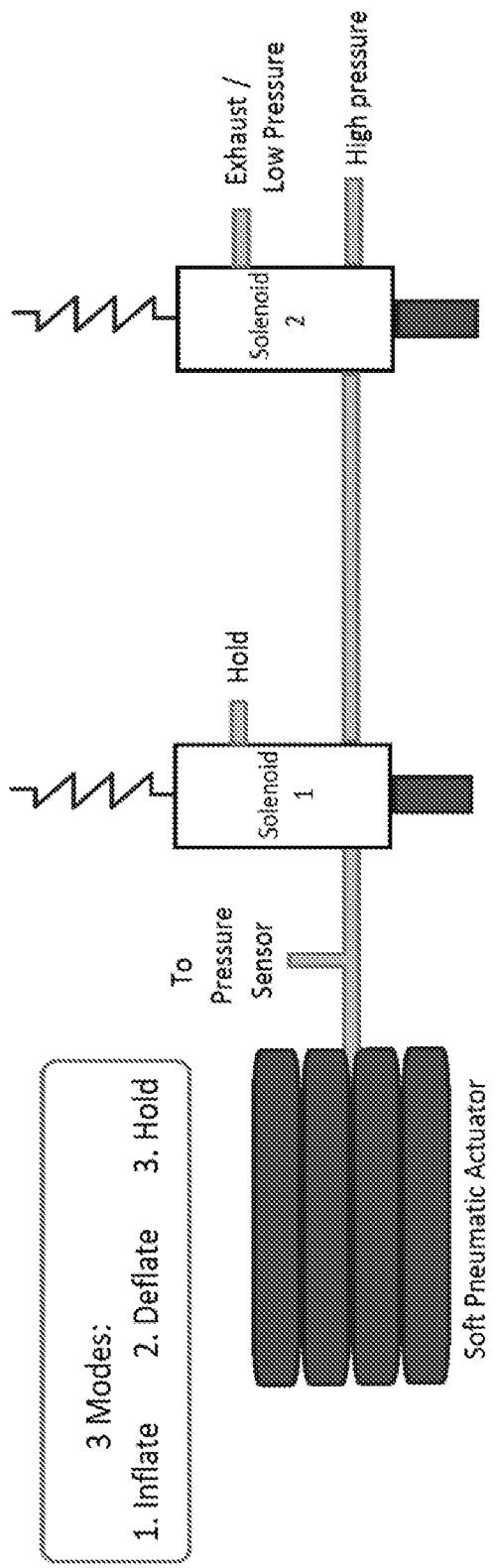
FIG. 11 shows an exemplary embodiment of the schematic of pressure control device.

Using the readings from pressure sensors, the microcontroller continuously monitors the pressures of the output channels as well as storage tanks. If the actual pressure at the output of a particular channel is not equal to the desired pressure, the microcontroller modulates the valves to facilitate air flow in or out of the output channel so as to bring the channel pressure to the desired value. FIG. 11 shows the schematic of the mechanism of operation. The system operates in three (3) primary modes: inflate, deflate and hold. When Solenoids 1 and 2 are ON, the air flows from the high-pressure tank to the actuator, and the actuator inflates. When Solenoid 2 is in OFF and Solenoid 1 is in ON, air flows out of the actuator, thus deflating it. Finally, when Solenoid 1 is OFF, the pressure of the actuator is maintained.

The description above was for actuators working on high pressure air or another gas. A similar approach is adopted for using actuators with vacuum. In each case, the pressure of the actuator is continuously monitored and accordingly, the microcontroller controls the flow to modulate the pressure as desired. In a variant, it is also possible to use other types of fluids, for example liquids.

Whenever an actuator connected to a channel deflates, the pressurized air is exhausted to the ambient. This constitutes a direct loss of high energy from the pressurized air. To reuse the energy of deflating actuators, the high pressure from the deflating of the actuators is directly fed back to the inlet of the compressor, thereby providing for a regenerative mechanism. This can be done either by directly connecting the output of the actuators to the inlet of the compressor or using a regenerative tank. This helps to improve overall efficiency of the system, thus improving battery life.

Figure 12:
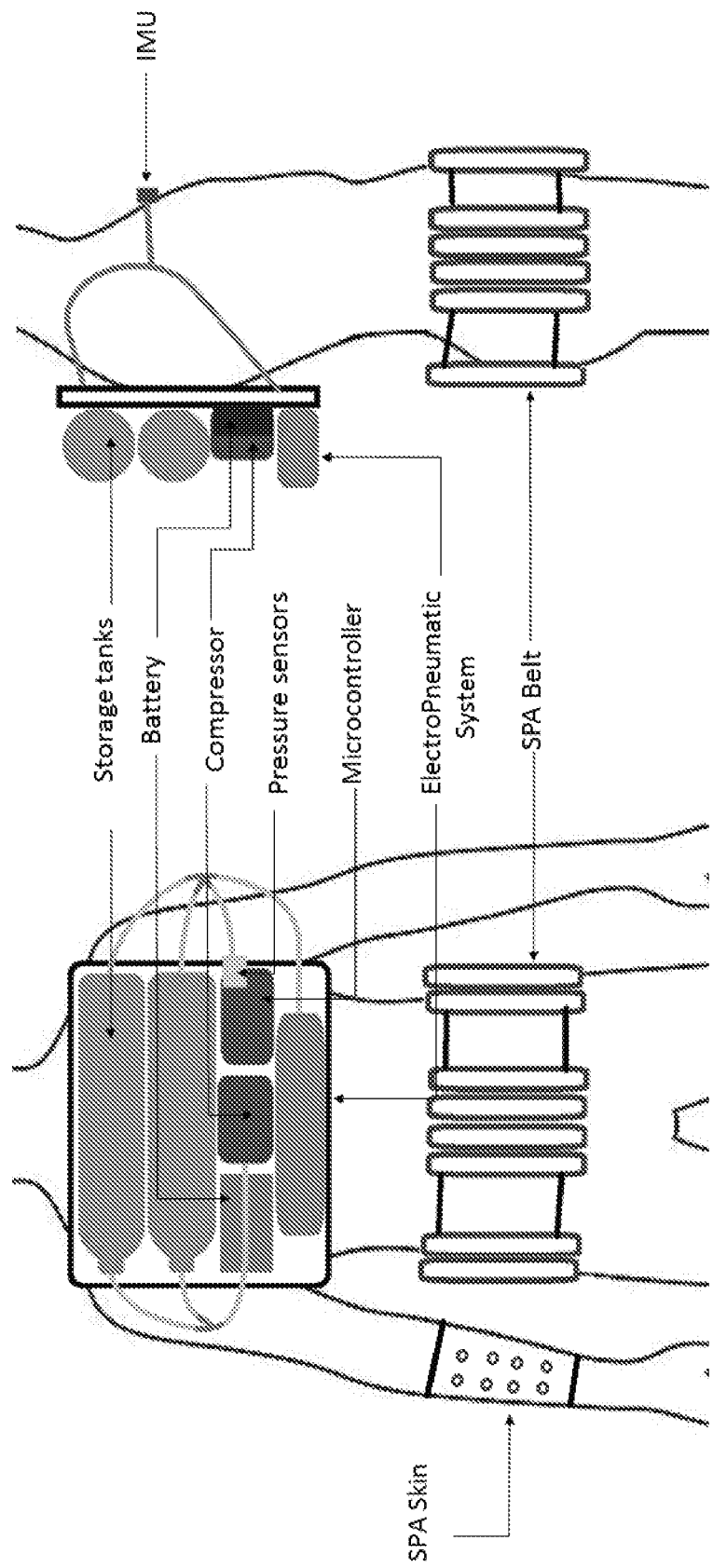
FIG. 12 shows an exemplary embodiment of a schematic of an SPA belt with power system, pneumatic supply, and pressure control.
Figure 13A:
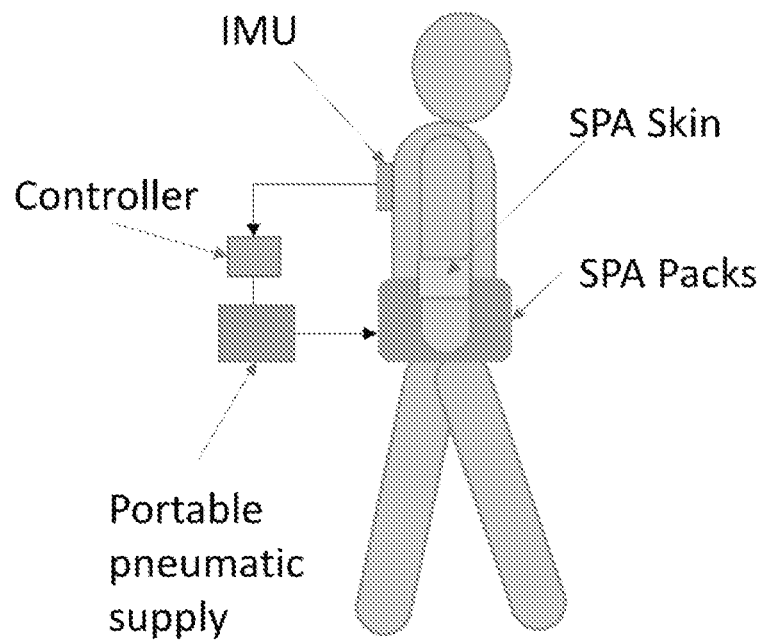
FIGS. 13A to 13D shows features related the suit and different applications, with FIG. 13A exemplarily showing a schematic diagram of the fully wearable interactive suit concept combining multi-scale physical feedback actuation, and integrated sensing, powered by compact and efficient pneumatic power supply. The suit enables intuitive forms of communication for various applications including ski as shown in FIG. 13B, golf training as shown in FIG. 13C, or feedback affecting balance as shown in FIG. 13D.
Figure 13B:
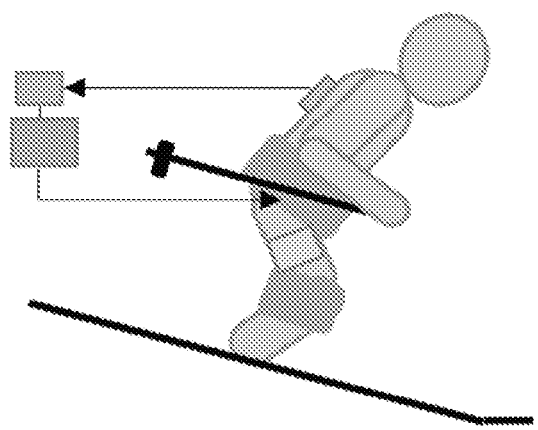
Figure 13C:
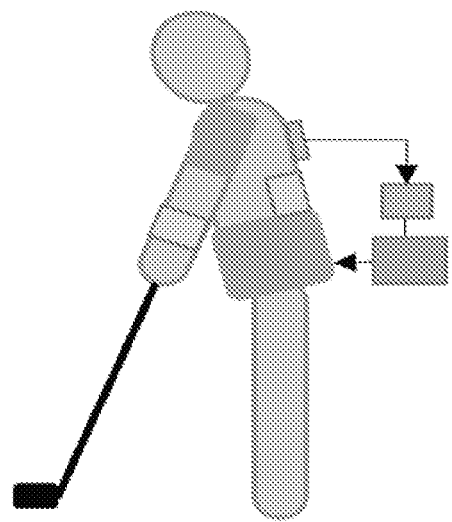
Figure 13D:
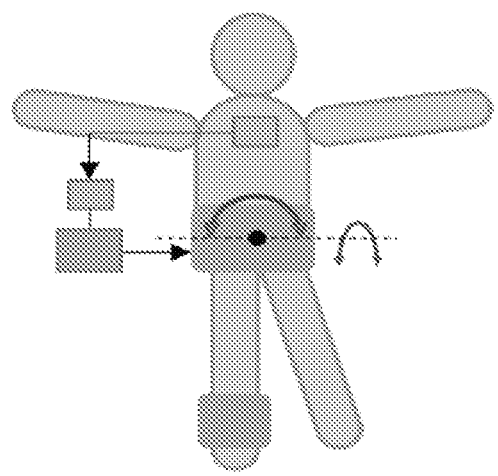

All the components of the system such as the compressor, battery, valves, etc. can be selected based on the user's requirements of flow rate, pressure, life in one charge, etc. Because the overall system was to be made portable, the portable power and control system was designed in the form of a bag-pack. FIG. 12 shows the schematic of the developmental prototype. It weighs no more than four (4) kilos, it can provide a pressure of up to 3.5 bar, and a flow rate of the fluid of around twenty (20) liters per minute at two (2) bar, and a vacuum of 0.8 bar below atmosphere with a flow rate of 7 liters per minute. In one charge, the system can run continuously for 1 hour.

According to another aspect of the present invention, a method for operating a wearable device is provided, the wearable device including a plurality of soft pneumatic actuators configured to be in connection with a wearer, each having a strain measurement sensor associated therewith, a wearable pneumatic system having an electric power supply, a compressor, two storage tanks for fluids having two different pressures, for example a fluid having a first pressure and a vacuum, i.e. a fluid with a second negative pressure, and a plurality of fluid channels each having at least one valve to provide either one of the two the pressurized fluid to the each one of the soft pneumatic actuators. Moreover, a data processing device such as a microprocessor is arranged to control the compressor and the wearable pneumatic system. The method can include a step of selectively providing a fluid to one of the plurality of plurality of soft pneumatic actuators to mechanically expand a sensing area or inflation area of the respective soft pneumatic actuator by the microprocessor, by delivering a pressured fluid from one of the storage tanks, a step of measuring a pressure exerted to the stretchable strain sensor associated to the respective soft pneumatic actuator.

Figure 14:
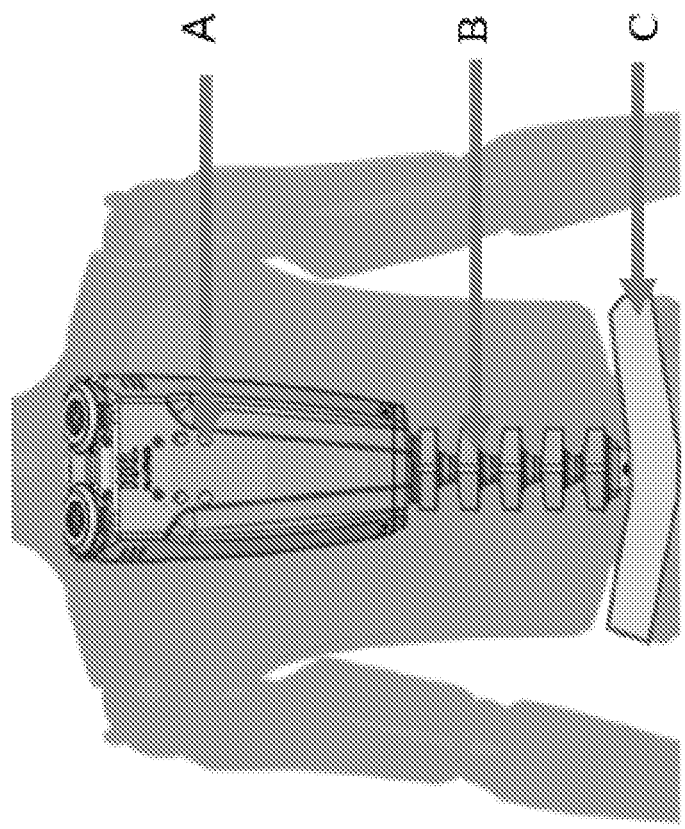
FIG. 14 shows a schematic side and back view of a wearable power and control unit or wearable power and control system.
Figure 14:
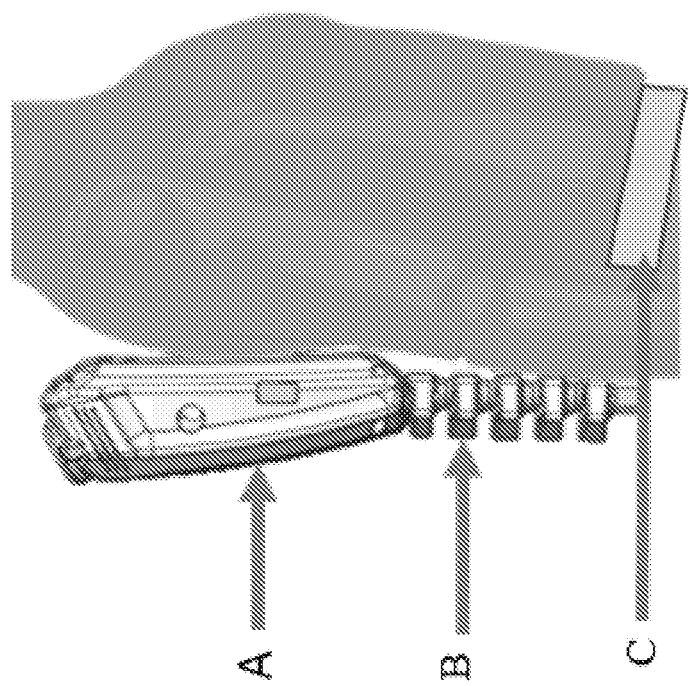

FIG. 14 shows a side and a back view of a wearable power and control unit or wearable power and control system. The wearable power and control unit includes a portable power unit A, a wearable support unit B and a waist belt C. The power unit A is in the form of a backpack, and includes a compressor, a battery, valves, sensors and electronics. The wearable support unit B is in the form of an exo-spine. The exo-spine is configured to transfer and redistributes the weight of the portable power unit A to the waist via the waist belt C. Additionally, the support unit B includes elastic elements that provide passive support to the wearer to maintain an upright posture, via support from the waist belt C.

Figure 15:
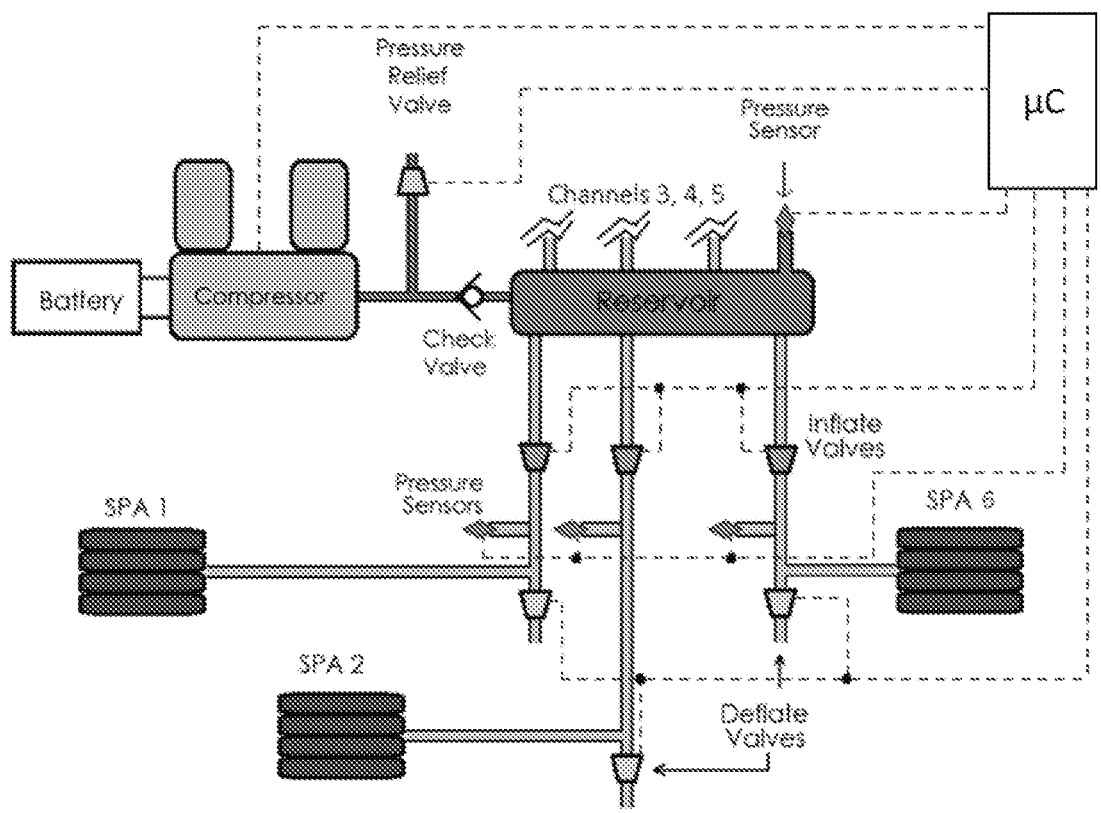
FIG. 15 shows a schematic representation of the wearable power and control unit or wearable power and control system.

FIG. 15 shows a schematic exemplary representation of elements and devices of the portable power unit C, including a battery-powered compressor that generates pressurized air or other gas as a fluid, and stores it in a fluid reservoir, for example a Polyethylene terephthalate (PET) container. The reservoir includes six (6) output channels, each one of the output channels having a system of valves and a pressure sensor. In FIG. 15, for simplification purposes, only SPA1, SPA2, and SPA6 are shown, but there can be many more SPA connected to a corresponding number of outlet channels, but also less than six (6) SPA. For example, each channel can have an inflate valve, a pressure sensor, and a deflate valve, and a fluid outlet located between the inflate and the deflate valves to provide fluid to a respective SPA. One pressure sensor is in operative connection with the reservoir to measure the pressure of the reservoir. The pressure sensor associated with the respective channel is configured to measure a pressure to the fluid that leads to an SPA. Pressure sensors, inflate valves, deflate valves, compressor, pressure relief valve is all connected to a microcontroller, and the microcontroller is configured to monitor each output channel, and depending on the reference value, modulates their pressure and output flow via the corresponding valve. Soft pneumatic actuators SPA1, SPA2, . . . , SPA6 can be parts of the wearable exoxuit described above.

Figure 16:
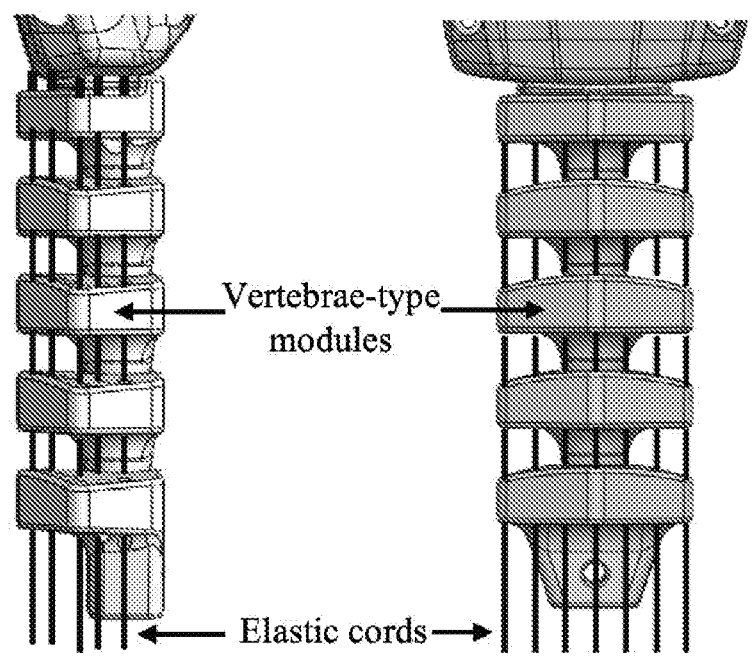
FIG. 16 shows a schematic side and back view of the wearable support unit that links the wearable power and control unit to a waist belt.

FIG. 16 shows a side and a front view of the wearable support unit B. Wearable support unit B includes a series of individual vertebrae-type modules or elements placed on top of each other to form an exo-spine. The vertebrae-type modules of the support unit B are held together by elastic cords going traversing each one of the modules. In the variant shown, there are seven (7) evenly spaced out elastic cords that are tensioned, arranged in parallel to the axis of longitudinal extension of the exo-spine. This structure is flexible and compliant, but at the same time, can support the load of the portable power unit A. It can transfer and redistribute the weight of the power unit A to the waist of the wearer, via the waist belt C.

The pneumatic power generated by the portable power unit A or device can be locally stored in a reservoir system, for example by having two different chambers or reservoirs for pressurized fluid and vacuum, and then distributed to different power several devices through its multiple output channels. Moreover, electric power can be provided by a battery to operate the compressor, to provide for electric power for powering the electro-pneumatic system including the sensors, the microcontroller, as well as external devices. The power generating system, reservoirs and output channels can be optimized to meet the desired output requirements and imposed constraints. A wearable support unit or device can be built to be wearable and to house the power unit, for example a structure that can be worn on the body like a small back pack.

Additionally, passive elements or active elements that are powered by the portable power unit, can support the motion of the user. The overall system thus, has two functions, to produce power in a portable and wearable form factor, and simultaneously serving a second function to provide support to the wearer, with the combination of portable power unit A, support unit B, and waist belt C. In the variant shown in FIG. 14, the portable power unit A is configured to power six (6) soft pneumatic actuator (SPA) packs. Schematic representations of the portable power unit A and support unit B are shown in FIGS. 15 and 16 respectively, and elements thereof in FIGS. 9-11.

Figure 17:
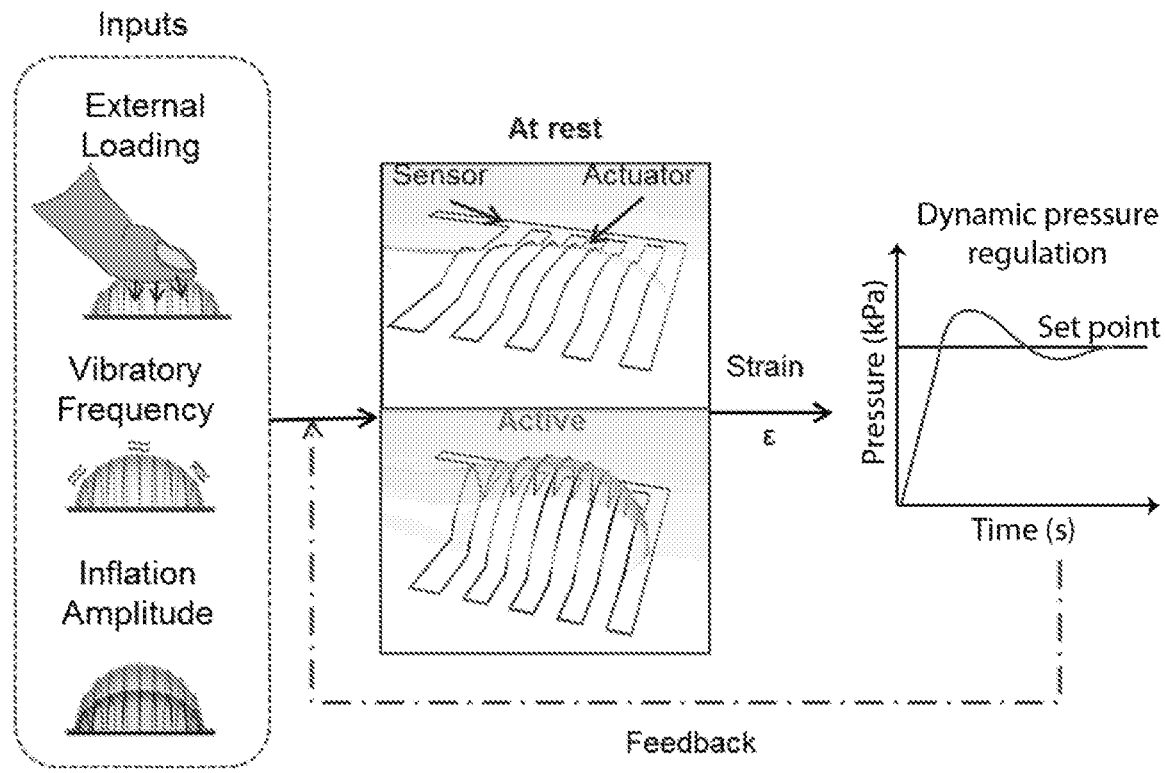
FIG. 17 shows a schematic exemplary view of the meander-like stretchable strain sensor according to an aspect of the present invention.

FIG. 17 shows a schematic exemplary view of the meander-like stretchable strain sensor or a SPA actuator with integrated strain sensor according to an aspect of the present invention. The stretchable strain sensor is very thin (<500 µm) and proposed a skin-like wearable interface that can deliver a closed-loop vibro-tactile stimulation, up to 100 Hz frequency, regardless of external loading conditions, as shown in FIG. 17. The proposed SPA-skin as an actuator is embedded with the stretchable strain sensor but can remain entirely soft thus acting as a low-profile monolithic functional material. The strain sensor is capable of producing feedback controlled actuation forces up to 1 N with resolution of 0.05 N. An entirely soft design allows the SPA-skin to be flexible, conformal, and distributable over a variety of surfaces. Closed loop control of the strain sensor and SPA actuator guarantees a constant force for generalized loading conditions and under dynamic operation.

Figure 18A:
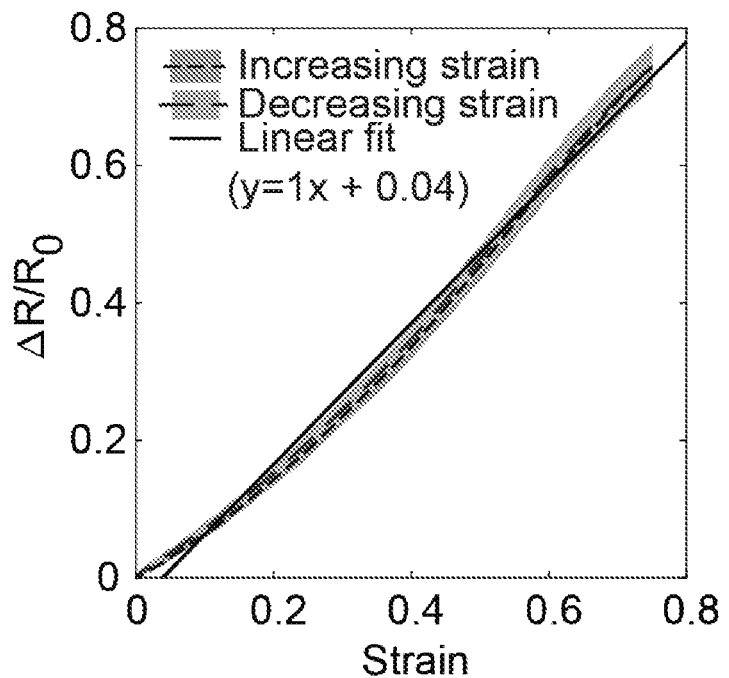
FIGS. 18A to 18C show information related to the exemplary stretchable strain sensor of FIG. 17 that can be used for an actuator, according to another aspect of the present invention, with FIG. 18A showing an average nominal sensor resistance change as a function of strain, with FIG. 18B showing different sample design layouts for the SPA, and FIG. 18C showing a perspective view of an exemplary embodiment of the SPA with the stretchable strain sensor, as a sensor-actuator system.
Figure 18B:
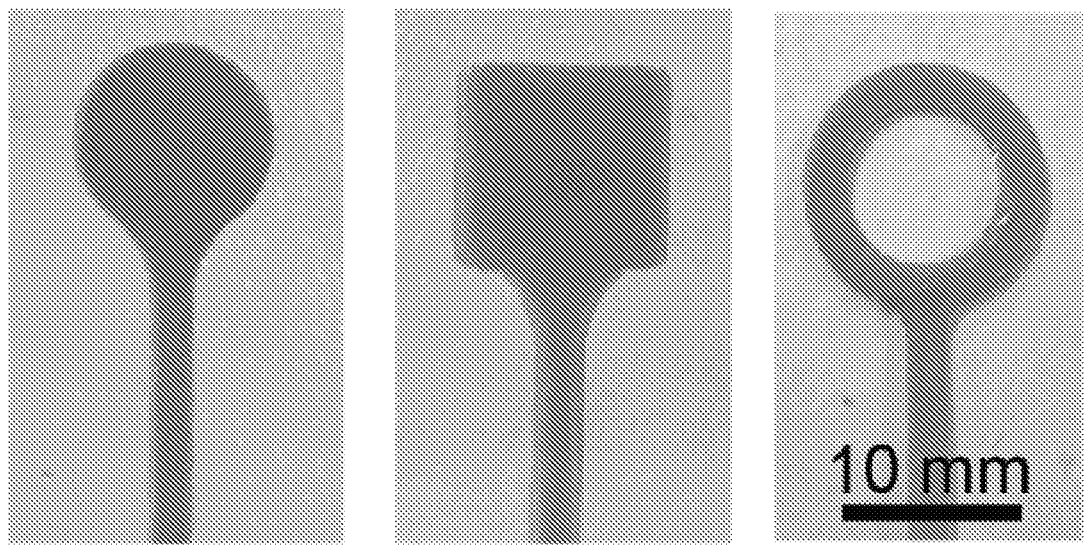
Figure 18C:
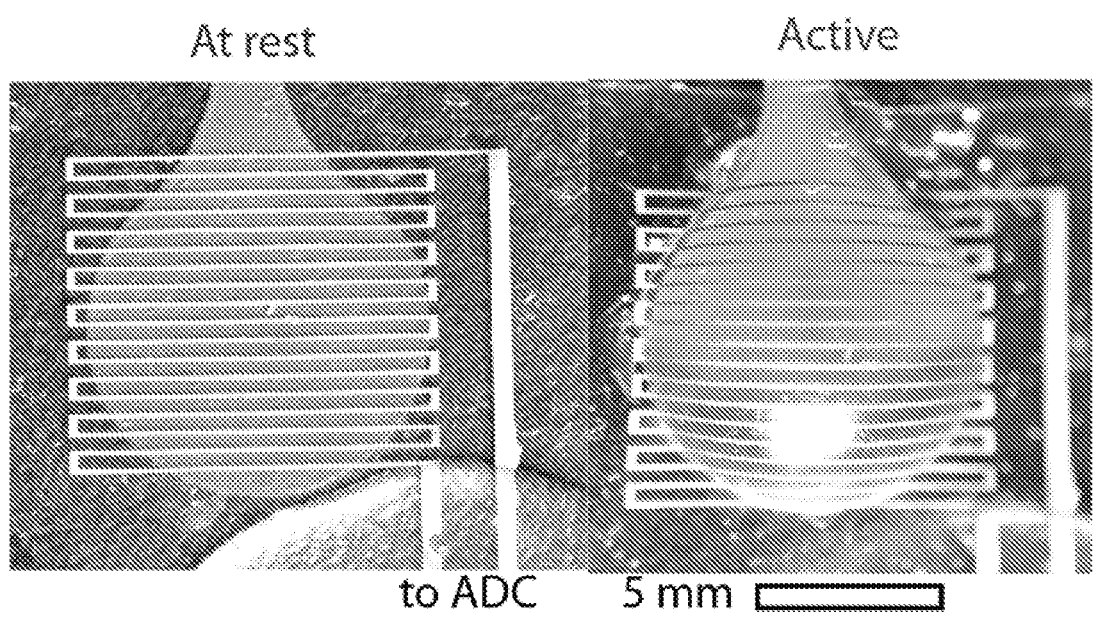

The SPA skin forms a sensor-actuator system that includes a soft silicone elastomers and thin biphasic metal films, as depicted FIG. 18C. The actuator membrane (SPA) includes an elastomeric membrane that can be pneumatically inflated with a positive pressure input. The actuator includes three thin layers: a flexible mask layer (50 µm), which defines the actuator inflation geometry, sandwiched between two silicone layers, with a total thickness of not more than 500 µm. The laser machined mask is laminated onto the bottom silicone layer and is encapsulated by the thin top silicone layer. The polypropylene mask adheres to the bottom silicone and ensures that, upon inflation, deformation occurs in the top membrane. The actuator geometry is governed by the spatial resolution requirement of 20 mm and force requirement of up to 1 N for sensitivity on the application areas on human back or wrist.

The actuator area is 10 mm in diameter and has a 2 mm inlet tube. Soft strain sensors are prepared with stretchable biphasic (liquid-solid) Gallium-based metallization patterned on a thin silicone membrane, and are laminated on top of the actuator to complete the soft actuator-sensor interface. The layout of the strain sensor covers the entire area of the SPA to record changes in strain upon inflation with positive input pressure. The soft sensor-skin hosts metallic meanders on a 40 μm thick (substrate and encapsulation) PDMS membrane patterned at the resolution limit of the biphasic metallization technique to maximize the sensor sensitivity. The entire SPA-skin is fabricated using Polydimethylsiloxane (PDMS) (Dow Corning Sylgard 184) because of its low viscoelasticity and because multiple layers can be covalently bonded with an oxygen plasma. The intentional use of same material for both the actuator and the sensor substrate yields a robust monolithic functional skin with embedded sensing and actuation capabilities.

Upon inflation of the SPA, as shown in FIG. 18C with the rest position and then the active, inflated position, the resistance of the sensor increases due to increase in the biaxial strain. Here, a negligible hysteresis is observed (<5%, independent of strain rate) and rapid response time (<1 Ms). The gauge factor of the stretchable metallization, approximately 1, is independent of the strain rate. The ultra-thin sensor has a minimal effect (<10% change in the actuator inflation after integration) on the actuator performance. The covalent bonding between sensor and actuator layers ensures the conformity of sensor around the actuator upon inflation leading to accurate estimation of the strain experienced by the SPA by sensors, even at high strain rates. As a result, the system exhibits remarkable stability, with less than 10% deviation in the relative change in resistance (ΔR/R) obtained during high strain rate operation at 20 Hz to a pressure of 25 kPa for 1 million cycles. The sensors also demonstrate rapid response times, meeting the demands of the high frequency action. During the cyclic test of 1 million cycles at 20 Hz, a 10% change of resistance per cycle was observed. This corresponds to an average strain rate of 400%/s (10%×2×20 Hz) experienced by the SPA-skin for the million cycles, with continuous current consumption at 1.25 mA throughout the 14 hours of testing.

With respect to FIGS. 18A to 18C, according to another aspect of the present invention, the stretchable strain sensor that can be specifically used together with the SPA is further discussed. For example, with FIG. 18A, an average nominal sensor resistance change is shown with standard deviation for strain rates: 0.018 mm/s, 0.18 mm/s and 1.8 mm/s, in increasing and decreasing directions of the applied uniaxial strain. The linear fit for the average resistance change gives gauge factor (GF) of '1'. FIG. 18B shows three exemplary layouts or designs of an SPA, showing an actuation head for expansion/inflation and a fluid channel of providing pressurized fluid or vacuum, demonstrating the configurability and distributability of the SPA skin design. The brown colored mask determines the inflation region for SPA. FIG. 18C shows an exemplary SPA skin design and the flexibility of the sensor-actuator system, with eight independent sensor strips arranged in parallel to each other, with a distance spacing of 100 μm placed on a 10 mm diameter actuator head.

Figure 19A:
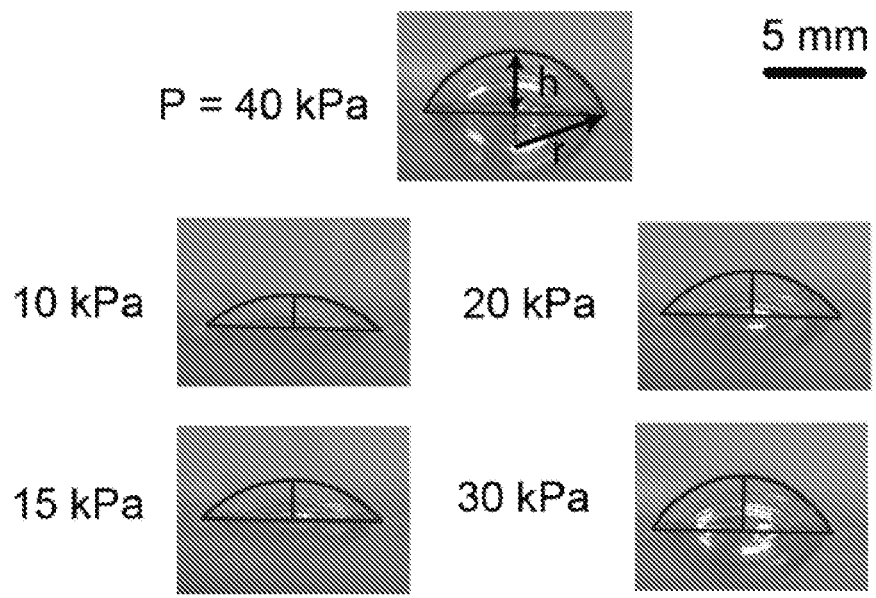
FIGS. 19A to 19D show experimental results achieved with the stretchable strain sensor in conjunction with the SPA actuator, with FIG. 19A showing a side perspective view of the expansion of the stretchable strain sensor based on an expansion of the SPA, with FIG. 19B showing an inflation radius r of the different strips of the meander of the strain sensor as a function of the inflation height h, with FIG. 19C showing the uniaxial strain distribution over the sensor meander of the strain sensor, and with FIG. 19D showing the average measured strain versus the actuator input pressure.
Figure 19B:
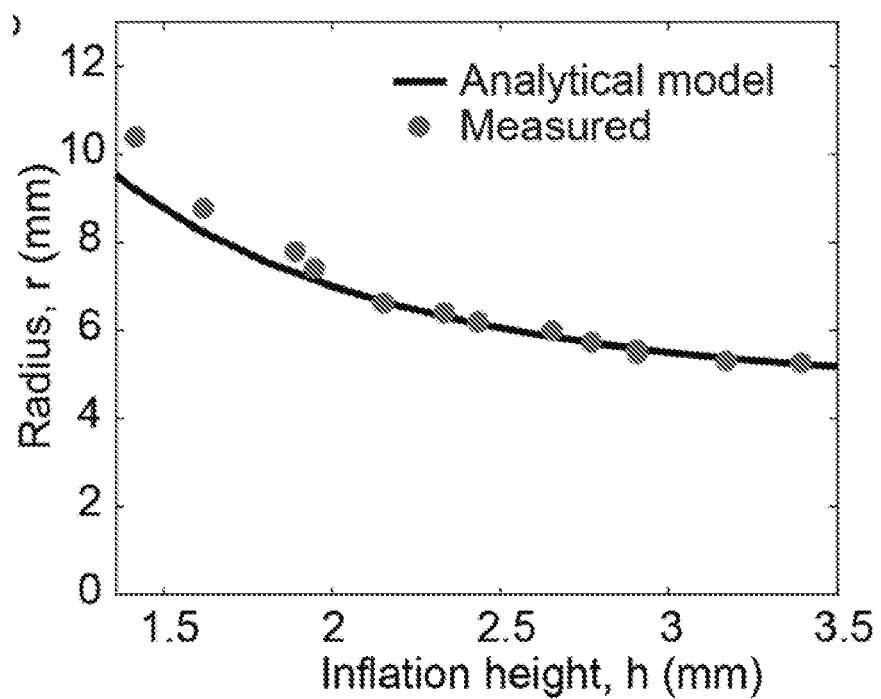
Figure 19C:
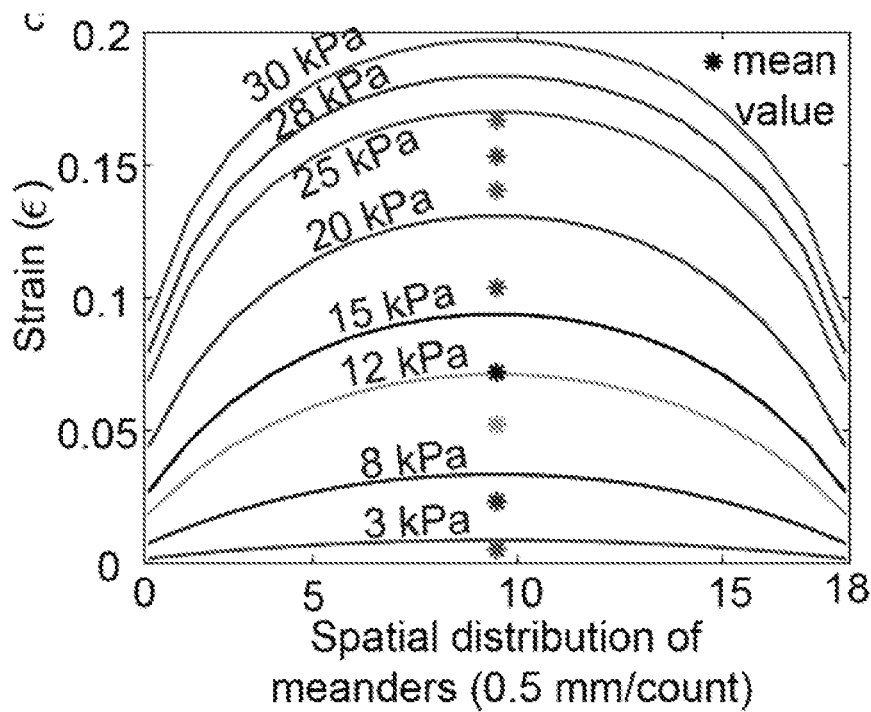
Figure 19D:
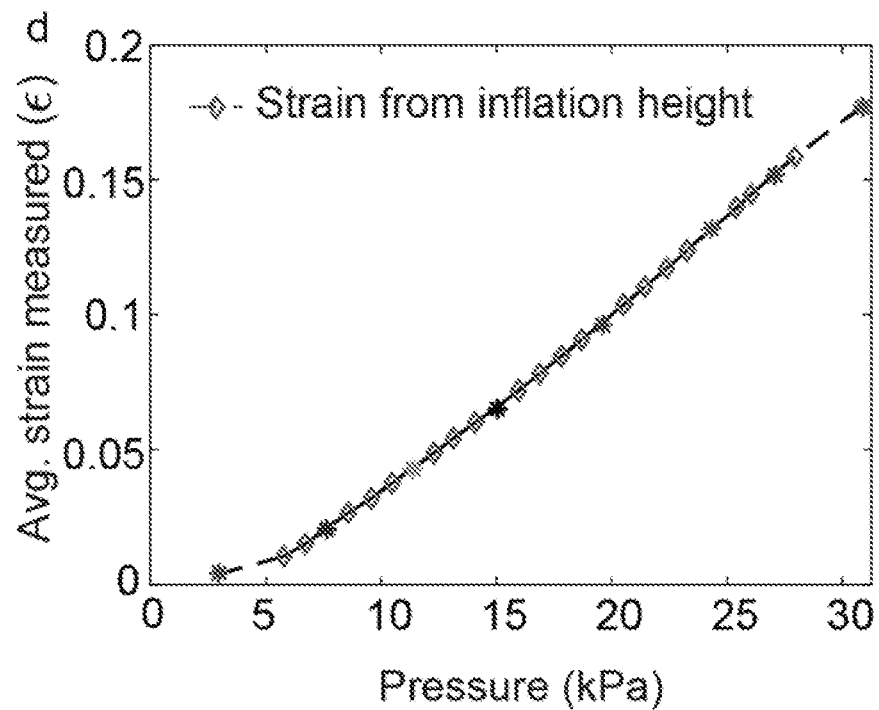

With respect to FIGS. 19A to 19D, an analytical model for the SPA inflation and stretch sensor measurement has been provided and tested. FIG. 19A shows a side perspective view of different ranges of SPA inflation or expansion, forming an inflation radius r, to expand the strips of the strain sensor to different inflation or expansion heights h and different inflation or expansion radii r, based on different actuation pressures of the SPA, for validating a geometrical model of the strain sensor. FIG. 19B shows the experimental measurement of inflation radius r compared with the geometric model assuming the SPA inflation geometry as a part of a scooped sphere. FIG. 19C shows that the analytical model predicts uniaxial strain over each sensor meander using the measured inflation height. The mean value of the sensor strain determines the measured change in the resistance of the sensor. FIG. 19D shows that the measured average strain from the analytical model is plotted with respect to the actuator input pressure. Each marker having a star shape (*) maps to the corresponding mean value of the strain in FIG. 19C and is then used to validate the strain model with measurements from sensor resistance, as validated with the experimental setup shown in FIG. 20C.

Figure 20A:
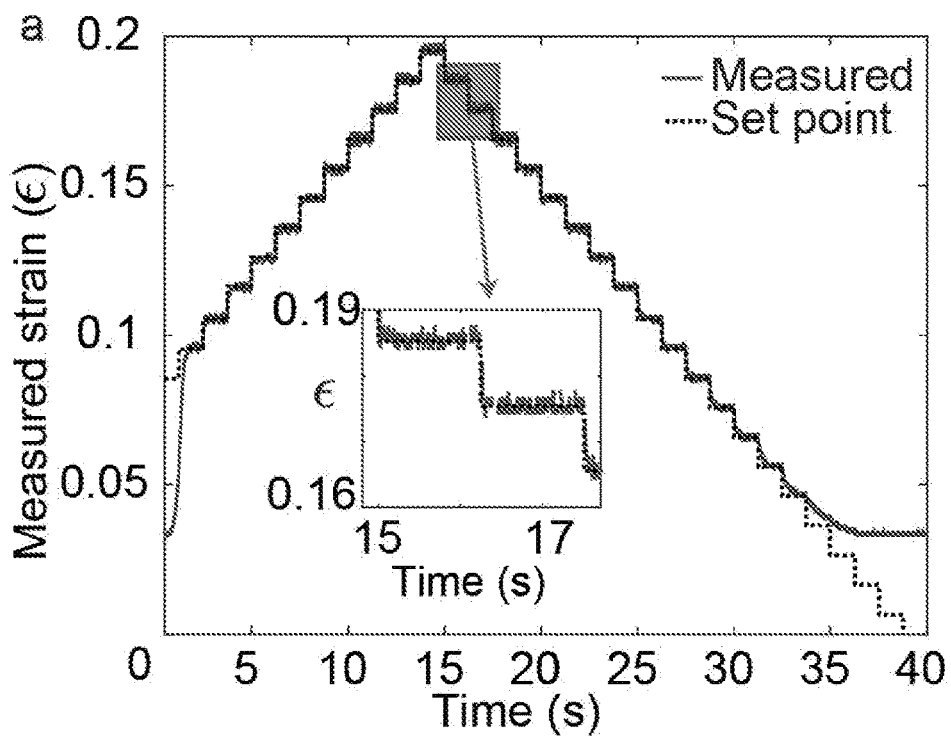
FIGS. 20A to 20C show an experimental setup for a closed-loop control of the actual strain versus the measured strain, with FIG. 20A showing a staircase set point versus the measured strain over time, with FIG. 20B showing an arbitrary set point over time, and with FIG. 20C showing an experimental setup for testing the strain sensor.
Figure 20B:
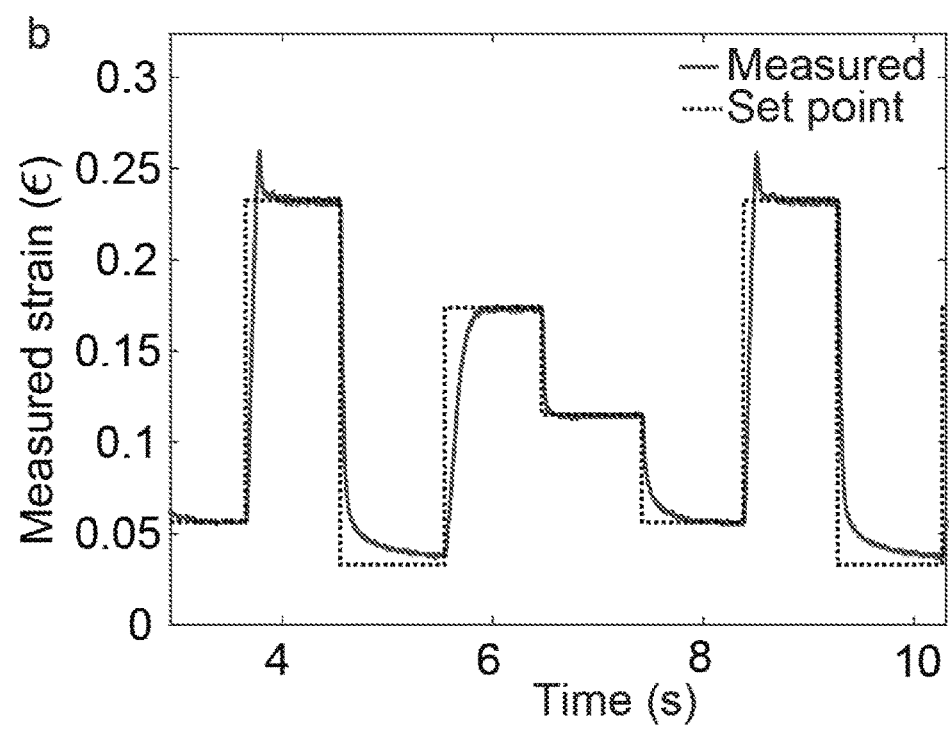
Figure 20C:
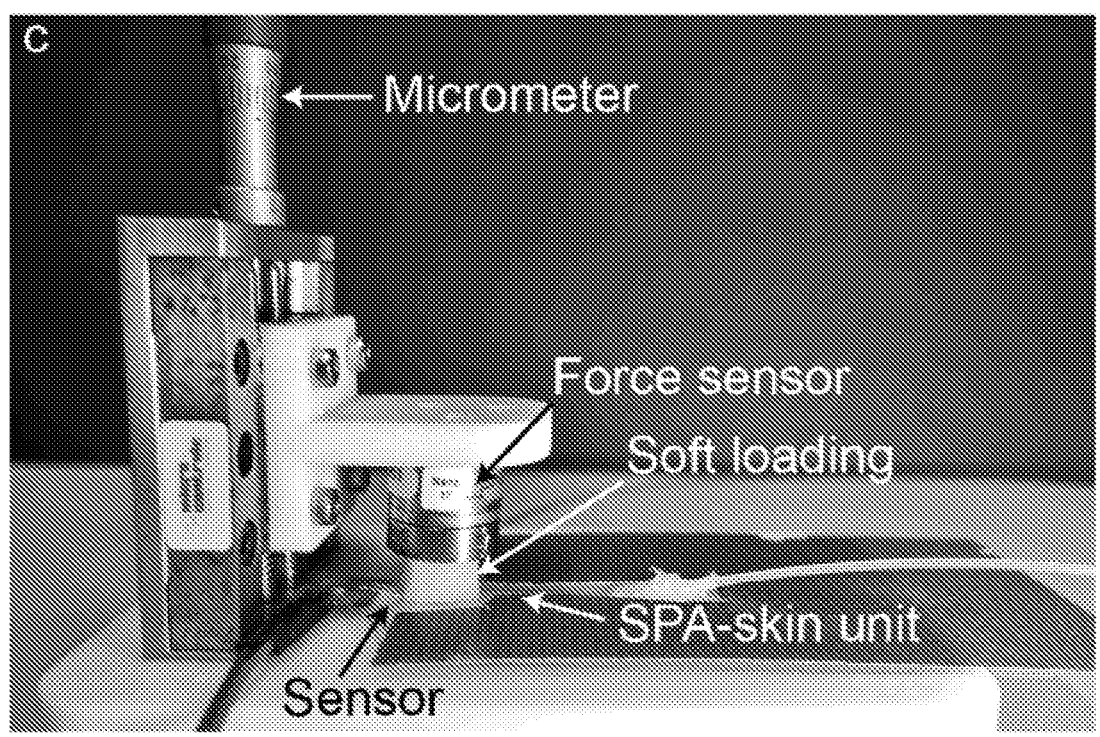

FIGS. 20A to 20C show the results of a closed loop evaluation of the stretchable strain sensor and the SPA actuation. FIG. 20A shows a staircase set point tracking using integrated stretchable strain sensor and external pressure regulation shows high precision performance of the controller to control the SPA-skin system. The controller cannot track the actuator state below 3% strain set point, as the SPA cannot be deflated further without an external preloading. In FIG. 20B, un the second test case, an arbitrary set point tracking test shows the stability of the proportional-integral-derivative (PID) controller over the full range of safe actuation (0-25% strain at 35 kPa) for the SPA-skin unit. As shown in FIG. 20C, a physical testbed system was used to validate the SPA-skin system model and test the active closed loop controller performance. This testbed system shown in FIG. 20C includes a precision micrometer to control the preload, a force sensor, a soft silicone preload to simulate the human skin, a pressure regulator, a microcontroller and a sensor readout electronics.

According to some aspects of the present invention, the devices described herein can take different forms without departing from the basic principle of operation. For example, a subsystem can be provided, having a bidirectional SPA skin that includes an on-the-skin distributed actuation wearable device, patch, or garment. The wearable device, patch or garment includes multi-modal actuation layers and sensing layers combined into one skin-like form. The device, patch or garment renders pixilated actuation in terms of micro- and macrostimulation by virtue of the actuation frequency and/or stimulation amplitude. Moreover, the wearable device, patch or garment has a flexible and stretchable form, sandwiching multiple layers together into a single functional input-output layer.

Moreover, according to another aspect, the wearable device, patch or garment can include one or more layers of different sensors including low profile discrete sensor elements distributed across the device with customizable pattern and size. These discrete sensor sensors can gather information about touch, texture, proximity, temperature, pressure etc. not only from the actuation layer but also from the external environment, for example from the skin if a wearer to which the device is in contact with. This ability to measure actuator feedback per pixel along with the sensing of external environment allows to take informed decision about best suitable and controlled stimulation. The discrete sensor elements can be arranged in a matrix-like pattern.

According to another aspect, the actuation layer with distributed soft pneumatic actuators (SPAs) is constructed or otherwise arranged using two silicone layers and a masking layer to define actuation areas, and/or channel routes. A tunable stiffness silicone layer reinforced with silk fibers to achieve a non-isometric, directionally controllable stiffness. This layer also acts as a physical separator between the actuation area from the pneumatic channels on the either side of the layer to isolate the vibrations generated due to actuation channels. A sensing layer with discrete piezoelectric elements, for example lead zirconate titanate (PZT)

elements distributed over the entire actuation area to record the vibration response from each SPA as well as the external environment.

According to another aspect, the sensing layer can be profiled with soft liquid metal sensors. For example, when interfaced or otherwise operatively connected to a computing device, for example a data processor, computer, mobile phone, tablet, etc. for example via a wireless or cabled transceiver, this skin-like multilayer device can enable new way to interact with others using the same or a similar wearable device, to use haptic input/output capabilities. The transmitting person would use the integrated sensor array as a keypad or a spatio-pressure recorder, and the receiving person would feel the same pattern recreated on his skin through the actuator layer, thus facilitating a transfer of touch. Also, similar to a braille system, a variety of static shapes, vibratory patterns or travelling waves can be generated to encode complex messages into a human perceivable form.

With selective combinations of input and output layers, it is possible to have a specific form of interaction with the same device. For example, a device can further include an optical display layer with the proximity sensing layer and/or the pressure sensing layer could be configured to replicate the visual distance or pressure gradient over the surface.

According to another aspect, a system can be provided that can be used for body manipulation with SPAs. For example, whole or partial body manipulation can be done for providing postural feedback to the wearer. For example, this system could employ actively powered by SPAs or SPA packs, having a modular arrangement of actuators for customized actuation over hip, trunk, or torso areas, and allow for large trunk motions for simulating strong body actions, for example but not limited to balance control. Thereby, the system can be used for training exercises, or virtual environments where postural information needs to be conveyed to the user, for example but not limited to the learning sports techniques like proper stance for skiing, or load carrying in Virtual Reality, golfing, or other sports requiring complex movements.

Also, such system could be seamlessly integrated with soft, flexible SPA skin layers. For example, for sensing directly against the body of the wearer at the muscle actuator interface, for closed loop control of high-force interactions or for other interface status monitoring, and for superimposed feedback modalities to incorporate both large body motions with vibrotactile or other stimulations, for augmented sensation or for relief. It is also possible that the device is composed of similar materials, SPA Muscle Packs can be directly fabricated with embedded SPA skin.

As another aspect of the present invention, a subsystem can be created that forms a soft exo-suit or exovest for targeted body motions. For example, an exemplary wearable system can include a muscle pack belt which act between the hip and torso to produce forces and moments affecting postural motion of the upper body, and the postural motion can be adjusted by positioning muscle packs at different points along the belt, or by controlling the pressure supplied to the muscle packs. Closed loop control can be provided for muscle pack belt, for example by using an Inertial Measurement Unit (IMU) to track and detect the angle of trunk motion on a test platform, and measured trunk position during open loop application of an oscillating lateral perturbation from the belt. It has been shown that naive subjects are able to "follow" the induced motions of the belt without instruction, as evidence that the muscle pack belts are capable of providing persuasive feedback and inducing reactions at the scale of large body segments.

Also, with such system it is possible to provide for targeted body segment feedback. For example, by utilizing soft straps, body harness, or other similar constraint mechanisms, more complex body motions can be induced. For example, this allows to convey more advanced or specific postural information to user, for example but not limited to twisting, bending motions at specified locations. Also, this can be used to display or simulate common physical interactions or gestures, for example but not limited to moving objects, hand-shake, hug. Moreover, for this purpose, the system can be customized to various body types and abilities. For example, an adjustable synthetic fabric belt using hook-and-loop fasteners can be configured to reconfigure flat SPA muscle pack belts or waist bands around the perimeter of the waist.

According to another aspect of the present invention, a portable pneumatic supply device is provided. For example, the portable pneumatic supply device can be wearable and untethered pneumatic supply unit to power soft actuators. The portable pneumatic supply device can include a fluid compressor, such as but not limited to an air compressor, a battery pack, compressed fluid and vacuum storage tanks, control valves and air distribution manifold, and microcontroller or microprocessor unit. This fluid system, for example by using air as a fluid, is capable of providing pressurized air with up to 3.5 bar, with two (2) bar at twenty (20) liters per minute, and 0.8 bar below atmospheric pressure at seven (7) liters per minute.

According to yet another aspect of the present invention with respect to the portable pneumatic supply device, there are several aspects that provide for an efficient design, including the use of low pressure air storage tanks to improve efficiency by recycling air exhausted by soft actuators. The weight can be made not to exceed four (4) kilograms, and the capacity of the battery as an electric power supply can be made to provide 1 hour of continuous runtime on a single charge.

In sum, according to various aspects of the present invention, the wearable device can include soft pneumatic actuators (SPAs) at a variety of dimensional scales, and an onboard, portable pneumatic supply device. The soft pneumatic actuators are designed and configured for custom purposes either to produce high force (SPA Packs) or to convey high fidelity information (vibrotactile SPA Skin), and are integrated with specialized materials for changing stiffness, changing shape, or sensing. The consolidated multimodal network of actuators and sensors comprising the device allow for modulated feedback based on the environment as well as onboard state monitoring for both communication and control.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims

REFERENCES

[1] H. Kazerooni, "Exoskeletons for Human Performance Augmentation," in *Springer Handbook of Robotics*, B. S. Prof and O. K. Prof, Eds. Springer Berlin Heidelberg, 2008, pp. 773-793.

[2] M. Aach, R. C. Meindl, J. Geßmann, T. A. Schildhauer, M. Citak, and O. Cruciger, "[Exoskeletons for rehabilitation of patients with spinal cord injuries. Options and limitations]," *Unfallchirurg*, vol. 118, no. 2, pp. 130-137, February 2015.

[3] A. J. del-Ama, A. D. Koutsou, J. C. Moreno, A. de-los-Reyes, A. Gil-Agudo, and J. L. Pons, "Review of hybrid exoskeletons to restore gait following spinal cord injury," *J. Rehabil. Res. Dev.*, vol. 49, no. 4, pp. 497-514, 2012.

[4] L. M. Vaca Benitez, M. Tabie, N. Will, S. Schmidt, M. Jordan, and E. A. Kirchner, "Exoskeleton Technology in Rehabilitation: Towards an EMG-Based Orthosis System for Upper Limb Neuromotor Rehabilitation," *J. Robot.*, vol. 2013, p. e610589, December 2013.

[5] H. Lee, W. Kim, J. Han, and C. Han, "The technical trend of the exoskeleton robot system for human power assistance," *Int. J. Precis. Eng. Manuf*, vol. 13, no. 8, pp. 1491-1497, August 2012.

[6] J. A. Rubi and R. S. Crockett, "Whole-body human-computer interface," WO2015002850 A1, 8 Jan. 2015.

[7] P. Maeder-York et al., "Biologically Inspired Soft Robot for Thumb Rehabilitation," *J. Med. Devices*, vol. 8, no. 2, p. 020933, 2014.

[8] P. Polygerinos et al., "Towards a soft pneumatic glove for hand rehabilitation," in 2013 *IEEE/RSJ International Conference on Intelligent Robots and Systems*, 2013, pp. 1512-1517.

[9] Y.-L. Park et al., "Design and control of a bio-inspired soft wearable robotic device for ankle-foot rehabilitation," *Bioinspir. Biomim.*, vol. 9, no. 1, p. 016007, March 2014.

[10] H. In, B. B. Kang, M. Sin, and K. J. Cho, "Exo-Glove: A Wearable Robot for the Hand with a Soft Tendon Routing System," *IEEE Robot. Autom. Mag.*, vol. 22, no. 1, pp. 97-105, March 2015.

[11] A. T. Asbeck, "Soft exosuit for hip assistance," *Robot. Auton. Syst.*, vol. 73, pp. 102-110, 2015.

[12] M. Wehner et al., "A lightweight soft exosuit for gait assistance," in *ResearchGate*, 2013, pp. 3362-3369.

[13] D. Yang, M. S. Verma, E. Lossner, D. Stothers, and G. M. Whitesides, "Negative-Pressure Soft Linear Actuator with a Mechanical Advantage," *Adv. Mater. Technol.*, vol. 2, no. 1, p. 1600164, January 2017.

[14] A. Firouzeh, M. Salerno, and J. Paik, "Soft pneumatic actuator with adjustable stiffness layers for Multi-DoF Actuation," in 2015 *IEEE/RSJ International Conference on Intelligent Robots and Systems (IROS)*, 2015, pp. 1117-1124.

[15] G. Gerboni, T. Ranzani, A. Diodato, G. Ciuti, M. Cianchetti, and A. Menciassi, "Modular soft mechatronic manipulator for minimally invasive surgery (MIS): overall architecture and development of a fully integrated soft module," *Meccanica*, vol. 50, no. 11, pp. 2865-2878, September 2015.

[16] P. Moseley, J. M. Florez, H. A. Sonar, G. Agarwal, W. Curtin, and J. Paik, "Modeling, Design, and Development of Soft Pneumatic Actuators with Finite Element Method," *Adv. Eng. Mater.*, vol. 18, no. 6, pp. 978-988, June 2016.

[17] M. A. Robertson, H. Sadeghi, J. M. Florez, and J. Paik, "Soft Pneumatic Actuator Fascicles for High Force and Reliability," *Soft Robot.*, October 2016.

[18] D. Yang et al., "Buckling Pneumatic Linear Actuators Inspired by Muscle," *Adv. Mater. Technol.*, vol. 1, no. 3, p. 1600055, June 2016.

[19] K. C. Galloway, P. Polygerinos, C. J. Walsh, and R. J. Wood, "Mechanically programmable bend radius for fiber-reinforced soft actuators," in 2013 *16th International Conference on Advanced Robotics (ICAR)*, 2013, pp. 1-6.

[20] J. Bishop-Moser and S. Kota, "Design and Modeling of Generalized Fiber-Reinforced Pneumatic Soft Actuators," *IEEE Trans. Robot.*, vol. 31, no. 3, pp. 536-545, June 2015.

[21] C. Laschi, B. Mazzolai, and M. Cianchetti, "Soft robotics: Technologies and systems pushing the boundaries of robot abilities," *Sci. Robot.*, vol. 1, no. 1, p. eaah3690, December 2016.

[22] L. Piwek, D. A. Ellis, S. Andrews, and A. Joinson, "The Rise of Consumer Health Wearables: Promises and Barriers," *PLoS Med.*, vol. 13, no. 2, February 2016.

[23] S. Patel, H. Park, P. Bonato, L. Chan, and M. Rodgers, "A review of wearable sensors and systems with application in rehabilitation," *J. NeuroEngineering Rehabil.*, vol. 9, p. 21, 2012.

[24] R. Xiao, G. Laput, and C. Harrison, "Expanding the Input Expressivity of Smartwatches with Mechanical Pan, Twist, Tilt and Click," in *Proceedings of the SIGCHI Conference on Human Factors in Computing Systems*, New York, N.Y., USA, 2014, pp. 193-196.

[25] K. Al-Nasser, "Smart watch," U.S. Pat. No. 8,725,842.

[26] P. Luckey, B. I. Trexler, G. England, and J. McCauley, "Virtual reality headset," U.S. Pat. No. D749,583.

[27] T. Starner et al., "Augmented Reality through Wearable Computing," *Presence Teleoperators Virtual Environ.*, vol. 6, no. 4, pp. 386-398, August 1997.

[28] U.S. Pat. No. 9,368,006, Wearable bracelet with bidirectional network connectivity and touch feedback

[29] U.S. Pat. Pub. No. 2014/0238153, Wood, Artificial skin and elastic strain sensor

[30] U.S. Pat. Pub. No. 2016/0290880, Lewis et al., Printed stretchable strain sensor

[31] A. U. Alahakone, S. M. N. A. Senanayake, in 2009 *IEEEASME Int. Conf. Adv. Intell. Mechatron.*, 2009, pp. 1148-1153.

[32] C. Laschi, B. Mazzolai, and M. Cianchetti, "Soft robotics: Technologies and systems pushing the boundaries of robot abilities," *Sci. Robot.*, vol. 1, no. 1, p. eaah3690, December 2016.

[33] "Vibration Motors|Precision Microdrives," https://www.precisionmicrodrives.com/vibration-motors, n. d.

[24] R. Sigrist, G. Rauter, R. Riener, P. Wolf, *Psychon. Bull. Rev.* 2013, 20, 21.

The invention claimed is:

1. A soft pneumatic actuator wearable device configured to be worn by a wearer, comprising: a bidirectional wearable skin including distributed actuator and sensing elements configured to interact with a skin of a body part of the wearer, and a body postural actuation device configured to impart a motion to the body part of the wearer, the distributed actuator and sensing elements including a multimodal actuation layer and a sensing layer, the bidirectional wearable skin being flexible and stretchable; and a portable power and control device for controlling the distributed actuator and sensing elements of the bidirectional wearable skin and the body postural actuation device, the portable power and control device including a controller for controlling the distributed actuator and sensing elements and the body postural actuation device, the controller configured to read signals from the sensing layer, and perform independent actuation with (i) the multimodal actuation layer for a micro- stimulation of the skin of the body part and actuation with (ii) the body postural actuation device for macrostimulation of the body part, to thereby emulate a direct physical interaction of the body part with an object.

2. The soft pneumatic actuator wearable device according to claim 1, wherein the sensing layer comprises:
a plurality of low profile discrete sensor elements distributed across the bidirectional wearable skin in an array.

3. The soft pneumatic actuator wearable device according to claim 2, wherein the discrete sensor elements are configured to measure at least one of touch, texture, proximity, temperature, and pressure from the multimodal actuation layer and from an external environment with which the soft pneumatic actuator wearable device is in contact with.

4. The soft pneumatic actuator wearable device according to claim 1, wherein the multimodal actuation layer comprises:
distributed soft pneumatic actuators arranged in an array, each actuator including two silicone layers and a masking layer to define an actuation area of pneumatic channels.

5. The soft pneumatic actuator wearable device according to claim 4, wherein the multimodal actuation layer further comprises:
a tunable stiffness silicone layer reinforced with fibers for a non-isometric, directionally controllable stiffness, arranged as a physical separator between the actuation area from the pneumatic channels to isolate vibrations generated due to the pneumatic channels.

6. The soft pneumatic actuator wearable device according to claim 1, wherein the body postural actuation device includes a soft exovest.

7. The soft pneumatic actuator wearable device according to claim 1, further comprising:
a waist belt,
wherein the body postural actuation device includes soft pneumatic actuators arranged around a perimeter of the waist belt to apply forces to the body part.

8. The soft pneumatic actuator wearable device according to claim 7, wherein the soft pneumatic actuators are arranged to provide for Anterior-Posterior (AP) and Medial-Lateral (ML) deflection of the body part of the wearer.

9. The soft pneumatic actuator wearable device according to claim 1, wherein the portable power and control device comprises:
a power generation system for producing at least one of a pressurized fluid or a vacuum;
a pneumatic reservoir for storing at least one of the pressurized fluid or the vacuum generated by the power generating system;
output channels operatively attached to the pneumatic reservoir for providing at least one of the pressurized fluid or the vacuum to the bidirectional wearable skin; and
an electro-pneumatic system in operative connection with the output channels, including a valve and a pressure sensor for each output channel, the electro-pneumatic system configured to control at least one of the pressurized fluid or the vacuum through the output channels.

10. The soft pneumatic actuator wearable device according to claim 9, further comprising: a portable power unit holding the power generation system, the pneumatic reservoir, the output channels, and the electro-pneumatic system, and the controller.

11. The soft pneumatic actuator wearable device according to claim 10, further comprising:
a waist belt.

12. The soft pneumatic actuator wearable device according to claim 11, further comprising:
a wearable support unit configured to transfer a weight of the portable power unit to the waist belt and configured to support a motion of the wearer.

13. The soft pneumatic actuator wearable device according to claim 12, wherein the wearable support unit includes at least one of a plurality of stacked vertebrae-like elements forming an exo-spine or a soft torso exosuit.

14. The soft pneumatic actuator wearable device according to claim 10, wherein the bidirectional wearable skin includes a plurality of stacked vertebrae-like elements forming an exo-spine or a soft torso exosuit.

15. The soft pneumatic actuator wearable device according to claim 11, wherein the body postural actuation device includes soft pneumatic actuators arranged in parallel packs arranged around a perimeter of the waist belt to apply forces.

16. The soft pneumatic actuator wearable device according to claim 9, wherein at least some of the output channels provide the pressurized fluid to a respective soft pneumatic actuator of the multimodal actuation layer that is arranged in operative connection with the wearer, each soft pneumatic actuator configured to provide a combination of force and vibration to the body and skin of the wearer.

17. The soft pneumatic actuator wearable device according to claim 1, wherein the sensing layer includes a force or strain sensor configured to measure a force applied to the body part of the wearer.

18. The soft pneumatic actuator wearable device according to claim 2, wherein each at least one of the plurality of low profile discrete sensor elements include a force or strain sensor configured to measure a force applied to the body part of the wearer.

19. The soft pneumatic actuator wearable device according to claim 17, wherein the controller is configured to perform a closed-loop force control based on a signal of the force or strain sensor, to provide for a feedback force to the body part of the wearer.

20. The soft pneumatic actuator wearable device according to claim 1, wherein the bidirectional wearable skin forms a sensor-actuator system including a plurality of soft actuators as the body postural actuation device, and a skin layer of the sensor-actuator system forms the distributed actuator and sensing elements.

21. The soft pneumatic actuator wearable device according to claim 16, wherein the bidirectional wearable skin forms a sensor-actuator system including soft actuators as the body postural actuation device, and a skin layer of the sensor-actuator system forms the distributed actuator and sensing elements, the body postural actuation device forms as a waist belt of the soft exovest.

22. A soft pneumatic actuator wearable device comprising: a bidirectional wearable skin including distributed actuator and sensing elements configured to interact with a skin of a body part of the wearer, and a body postural actuation device, the distributed actuator and sensing elements including a multimodal actuation layer and a sensing layer, the bidirectional wearable skin being flexible and stretchable; a portable power and control device for controlling the distributed actuator and sensing elements of the bidirectional wearable skin and the body postural device, the portable power and control device including a controller for controlling the distributed actuator and sensing elements and the body postural actuation device, the controller configured to read signals from the sensing layer, and perform independent actuation with (i) the multimodal actuation layer for a micro-stimulation of the skin of the body part and actuation with (ii) the body postural actuation device for macro-stimulation of the body part, to thereby emulate a direct physical interaction of the body part with an object; and a waist belt, wherein the body postural actuation device includes soft pneumatic actuators arranged around a perimeter of the waist belt to apply forces.

* * * * *